(12) United States Patent
Ko et al.

(10) Patent No.: US 12,008,221 B2
(45) Date of Patent: Jun. 11, 2024

(54) METHOD FOR PROVIDING TAG, AND ELECTRONIC DEVICE FOR SUPPORTING SAME

(71) Applicant: SAMSUNG ELECTRONICS CO., LTD., Suwon-si (KR)

(72) Inventors: Jaeho Ko, Suwon-si (KR); Daeun Park, Suwon-si (KR); Jiwon Jeon, Suwon-si (KR); Heewoon Kim, Suwon-si (KR); Hyunmi Park, Suwon-si (KR); Hyewon Park, Suwon-si (KR); Heungkyo Seo, Suwon-si (KR); Hyungdo Lee, Suwon-si (KR); Younghak Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 17/842,038

(22) PCT Filed: Dec. 16, 2020

(86) PCT No.: PCT/KR2020/018461
§ 371 (c)(1),
(2) Date: Jun. 16, 2022

(87) PCT Pub. No.: WO2021/125795
PCT Pub. Date: Jun. 24, 2021

(65) Prior Publication Data
US 2023/0185434 A1      Jun. 15, 2023

(30) Foreign Application Priority Data
Dec. 16, 2019   (KR) .................. 10-2019-0167929

(51) Int. Cl.
*G06F 3/0482*   (2013.01)
*G06F 3/0484*   (2022.01)
(Continued)

(52) U.S. Cl.
CPC .......... *G06F 3/0484* (2013.01); *G06F 3/0482* (2013.01); *G06V 20/70* (2022.01); *G06V 30/10* (2022.01)

(58) Field of Classification Search
CPC .......................... G06V 20/70; G06F 3/048–05
See application file for complete search history.

(56) References Cited

U.S. PATENT DOCUMENTS 8,566,329 B1 * 10/2013 Freed ................ G06F 16/24578
707/913
9,122,645 B1 *  9/2015 Amidon ............. G06Q 30/0251
(Continued)

FOREIGN PATENT DOCUMENTS

KR   10-2015-0019493    2/2015
KR   10-2016-0027848    3/2016
(Continued)

OTHER PUBLICATIONS

Extended European Search Report dated Dec. 16, 2022 issued in European Application No. 20902051.0 (10 pages).

*Primary Examiner* — Daniel Rodriguez
(74) *Attorney, Agent, or Firm* — NIXON & VANDERHYE P.C.

(57) ABSTRACT

An electronic device according to various embodiments of the disclosure comprises: a display, a processor operably connected to the display, and a memory operably connected to the processor, wherein the memory can store instructions which, when executed, cause the electronic device to: receive a first input while displaying a screen through the display; perform an operation related to a recognition opera- (Continued)

tion for the screen based on the first input, so as to acquire one or more first tags related to the screen; display, through the display, a first user interface including the one or more first tags; select at least one first tag from among the one or more first tags based on receiving a second input while the first user interface is displayed; acquire at least one second tag related to the at least one first tag; and display, through the display, a second user interface including the at least one second tag.

17 Claims, 17 Drawing Sheets

(51) Int. Cl.
*G06V 20/70* (2022.01)
*G06V 30/10* (2022.01)

(56) References Cited

U.S. PATENT DOCUMENTS

| | | | |
|---|---|---|---|
| 9,218,364 | B1 | 12/2015 | Garrigues et al. |
| 9,652,561 | B2* | 5/2017 | Sato ............... G06F 16/907 |
| 9,811,536 | B2 | 11/2017 | Morris et al. |
| 9,858,298 | B1* | 1/2018 | Barak ............ G06F 16/5866 |
| 10,482,280 | B2* | 11/2019 | Abi Antoun ........ G06F 21/554 |
| 10,540,378 | B1* | 1/2020 | Hsiao ............... G06F 18/24 |
| 2008/0201734 | A1* | 8/2008 | Lyon ............... H04N 21/812 |
| | | | 725/34 |
| 2008/0275850 | A1* | 11/2008 | Asai ............... G06F 16/58 |
| | | | 707/999.102 |
| 2009/0327336 | A1* | 12/2009 | King ............... G06F 16/48 |
| 2012/0219191 | A1* | 8/2012 | Benzarti ........... G06Q 30/0201 |
| | | | 709/204 |
| 2012/0323930 | A1* | 12/2012 | Kennberg ........ G06F 16/5866 |
| | | | 707/E17.02 |
| 2013/0129142 | A1* | 5/2013 | Miranda-Steiner ... G06F 16/587 |
| | | | 382/103 |
| 2013/0275880 | A1* | 10/2013 | Bachman ............ G06F 16/40 |
| | | | 715/751 |
| 2015/0100578 | A1* | 4/2015 | Rosen .............. G06F 16/907 |
| | | | 707/737 |
| 2016/0048537 | A1 | 2/2016 | Epstein et al. |
| 2016/0063124 | A1 | 3/2016 | Lee et al. |
| 2016/0085865 | A1* | 3/2016 | Weingarten .......... G06F 16/58 |
| | | | 707/728 |
| 2018/0060659 | A1* | 3/2018 | He ................. G06V 20/20 |
| 2018/0114334 | A1* | 4/2018 | Desai ............... G06V 10/82 |
| 2018/0150199 | A1 | 5/2018 | Kim et al. |
| 2018/0157387 | A1* | 6/2018 | Zhou ............... G06F 3/04845 |
| 2020/0285667 | A1 | 9/2020 | Gupta et al. |
| 2021/0181514 | A1* | 6/2021 | Martin ............. G02B 27/0101 |

FOREIGN PATENT DOCUMENTS

| | | |
|---|---|---|
| KR | 10-1659611 | 9/2016 |
| KR | 10-2017-0073589 | 6/2017 |
| KR | 10-2018-0060546 | 6/2018 |

* cited by examiner

| Type | Example | 1-1th tag | 1-2th tag | Second tag | Recommended function |
|---|---|---|---|---|---|
| Text 1 | A Coffee adds its fourth local cafe | ACoffee | A, A Sungsujeom | A_history, A Sungsujeom_phone number | location recommendation function |
| Text 2 | B company is working through its "C process" to figure out what to do about deepfakes | Bcompany | D, E | D quote, D property | - |
| Text 3 | Only those who will risk going too far can possibly find out how far one can go | maxim | TSEliot | TSEliot_life, Thewasteland | - |
| Text 4 | 'Night mode' of Galaxy S10 series optimized for night photography | Galaxy S10, night mode | - | Galaxy S10 Note, night mode_how to setup | Night mode function |

| Type | Example | 1-1th tag | 1-2th tag | Second tag | Recommended function |
|---|---|---|---|---|---|
| Image 1 | Image of scene where actor F is singing | Singing_Man | F, G | H, I | Function of reserving movie starring F |
| Image 2 | Image of user's smiling mother | SmileWoman | MyMom | Mother contacts | Function of shortcut to mother contacts |
| Image 3 | Image of sunset over Eungbongsan | landscape | Sunset EungBongSan | EungBongSan_night view, EungBongSan_parking lot | Function of recommending location |
| Image 4 | Image of shrimp food | food | Gambas, GambasAlAjillo, SpanishGarlicShrimp | Jrestaurant, Krestaurant | Function of recommending restaurant |
| Image 5 | Night image | night | - | L | Night mode function |
| Image 6 | Performance poster image | 2020JazzFestival | May25th OlympicPark | M_Festival, OlympicPark_location | Function of storing schedule, function of booking ticket |
| Image 7 | QR code image | QR QR_code | article internet payment | QR_code_scan method, QR_code_type | Internet function, payment function |

METHOD FOR PROVIDING TAG, AND ELECTRONIC DEVICE FOR SUPPORTING SAME

CROSS-REFERENCE TO RELATED APPLICATIONS

This application is a continuation of International Application No. PCT/KR2020/018461 designating the United States, filed on Dec. 16, 2020, in the Korean Intellectual Property Receiving Office and claiming priority to Korean Patent Application No. 10-2019-0167929, filed on Dec. 16, 2019, in the Korean Intellectual Property Office, the disclosures of which are incorporated by reference herein in their entireties.

BACKGROUND

Field

The disclosure relates to methods for providing a tag and electronic devices supporting the same.

Description of Related Art

The electronic device may classify content and search for content using a tag (e.g., a hashtag). For example, after obtaining an image using the camera, the electronic device may associate the obtained image with a tag related to the obtained image and store them. Upon receiving the user's input for searching for a specific tag, the electronic device may search for an image stored in association with the specific tag among a plurality of images stored in the electronic device and provide the searched image to the user.

Recently, electronic devices have provided a function for providing (or recommending) a tag. For example, upon receiving an input for capturing the screen displayed on the electronic device from the user, the electronic device may obtain (or generate) a tag related to the captured screen by recognizing (or analyzing) the captured screen and provide the obtained tag along with the captured screen.

The electronic device provides the user with only the tag obtained through the recognition operation performed by the electronic device on the screen displayed on the electronic device. Accordingly, the electronic device provides the tag obtained based on limited information and thus needs to provide the user with the tag obtained based on more various information.

SUMMARY

Embodiments of the disclosure may provide a method for providing a tag, which may provide various tags by performing a recognition operation on the screen displayed on an electronic device through the electronic device and an external electronic device (e.g., a server) connected with the electronic device and an electronic device for supporting the same.

According to various example embodiments of the disclosure, an electronic device may comprise: a display, a processor operatively connected with the display, and a memory operatively connected with the processor. The memory may store instructions that, when executed, cause the electronic device to: receive a first input while displaying a screen through the display, obtain one or more first tags related to the screen by performing an operation related to a recognition operation on the screen based on the first input, display a first user interface including the one or more first tags through the display, select at least one first tag from among the one or more first tags based on receiving a second input while displaying the first user interface, obtaining at least one second tag related to the at least one first tag, and display a second user interface including the at least one second tag through the display.

According to various example embodiments of the disclosure, an electronic device may comprise: a display, a processor operatively connected with the display, and a memory operatively connected with the processor. The memory may store instructions that, when executed, cause the electronic device to: receive an input while displaying a screen through the display, obtain at least one first tag related to the screen by performing a first recognition operation on the screen based on the input, display a first user interface including the at least one first tag through the display, obtain at least one second tag through a second recognition operation on the screen performed by an external electronic device connected with the electronic device and continuous from the first recognition operation while the first user interface is displayed, and display a second user interface including the obtained at least one second tag through the display.

According to various example embodiments of the disclosure, a method for providing a tag by an electronic device may comprise: receiving a first input while displaying a screen through a display of the electronic device, obtaining one or more first tags related to the screen by performing an operation related to a recognition operation on the screen based on the first input, displaying a first user interface including the one or more first tags through the display, selecting at least one first tag from among the one or more first tags based on receiving a second input while displaying the first user interface, obtaining at least one second tag related to the at least one first tag, and displaying a second user interface including the at least one second tag through the display.

According to various example embodiments of the disclosure, a method for providing a tag and an electronic device supporting the same may provide various tags by performing a recognition operation on the screen displayed on an electronic device through the electronic device and an external electronic device (e.g., a server) connected with the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is diagram illustrating an example method for providing a tag related to text according to various embodiments;

FIG. 7 is a diagram illustrating an example method for providing a tag related to an image according to various embodiments;

DETAILED DESCRIPTION

Figure 1:
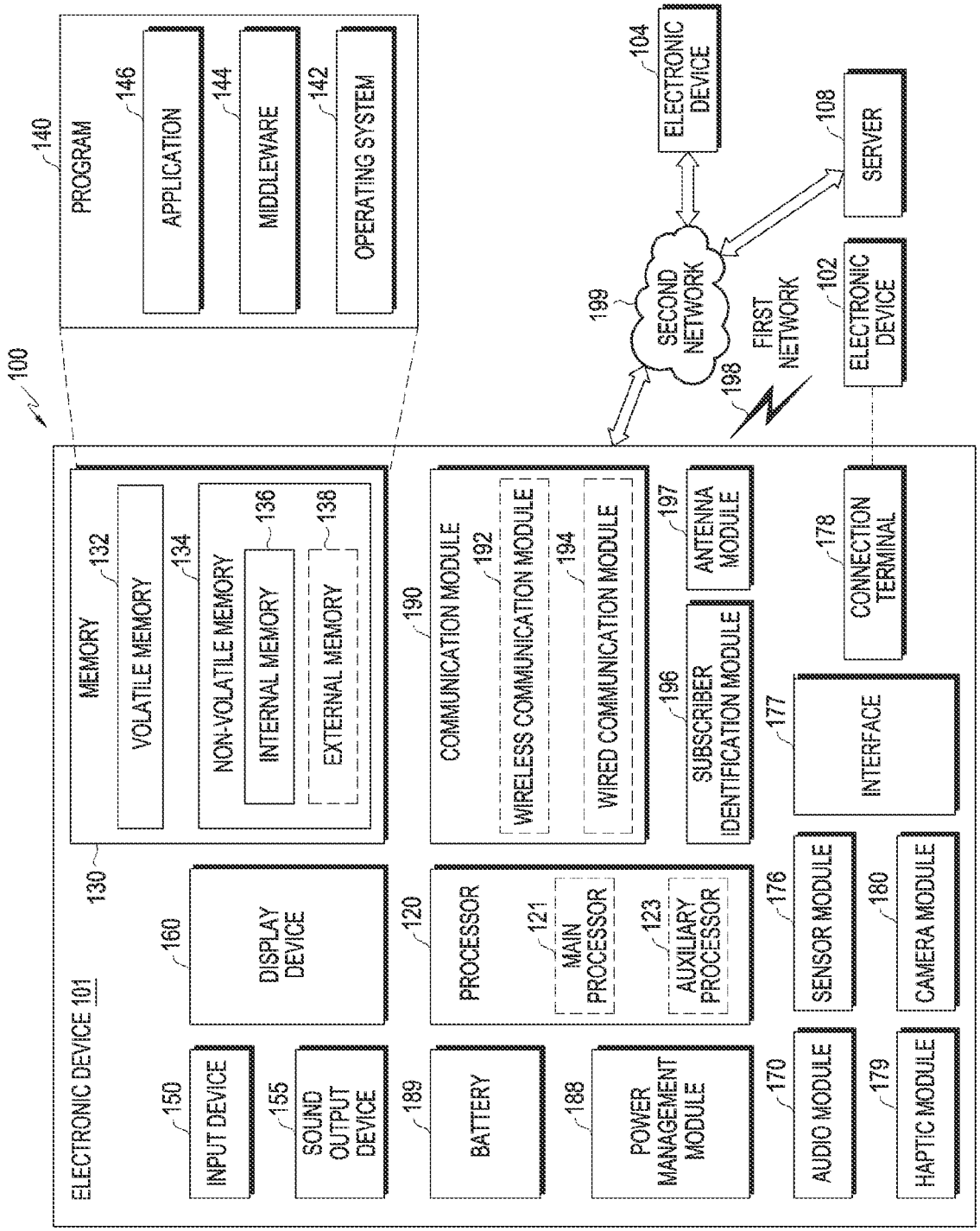
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments of the disclosure, an electronic device may comprise: a display (e.g., the display device 160), a processor operatively connected with the display, and a memory operatively connected with the processor. The memory may store instructions that, when executed, cause the electronic device to receive a first input while displaying a screen through the display, obtain one or more first tags related to the screen by performing an operation related to a recognition operation on the screen based on the first input, display a first user interface including the one or more first tags through the display, select at least one first tag from among the one or more first tags based on a second input while displaying the first user interface, obtaining at least one second tag related to the at least one first tag, and display a second user interface including the at least one second tag through the display.

In various example embodiments, the recognition operation on the screen may include: a plurality of recognition operations including a first recognition operation and a second recognition operation performed continuously from the first recognition operation. The first recognition operation may be performed by the electronic device, and the second recognition operation may be performed by an external electronic device (e.g., the server 108) connected with the electronic device.

In various example embodiments, the instructions, when executed, may cause the electronic device to: obtain at least one first first tag through the first recognition operation, obtain at least one second first tag through the second recognition operation, display the first user interface including the obtained at least one first first tag through the display, and display the first user interface including the first first tag and the at least one second first tag obtained by performing the second recognition operation while displaying the first user interface, through the display.

In various example embodiments, the instructions, when executed, may cause the electronic device to: obtain at least one first first tag through the first recognition operation, display the first user interface including the obtained at least one first first tag through the display, store the at least one first first tag in the memory in response to an input received while the second recognition operation is performed, obtain at least one second first tag as the second recognition operation is completed after the at least one first first tag is stored, and store, in the memory, the obtained at least one second first tag along with the at least one first first tag.

In various example embodiments, the instructions, when executed, may cause the electronic device to obtain the at least one second tag related to the at least one first tag, through the electronic device or an external electronic device (e.g., the server 108) connected with the electronic device.

In various example embodiments, the instructions, when executed, may cause the electronic device to: identify content stored in the memory in association with the at least one first tag and obtain at least one of at least one tag stored in association with the content or information related to the content, as the at least one second tag.

In various example embodiments, the instructions, when executed, may cause the electronic device to: identify content stored in association with the at least one first tag in the electronic device providing a web service subscribed to using an account of a user of the electronic device and obtain, as the at least one second tag, at least one of at least one tag stored in association with the content or information related to the content.

In various example embodiments, the instructions, when executed may cause the electronic device to display, through the display, the second user interface including the one or more first tags and the second tag.

In various example embodiments, the instructions, when executed, may cause the electronic device to: identify a function related to at least one tag of the second tag or the one or more first tags and display, through the display, the first user interface or the second user interface including an object representing the identified function.

According to various example embodiments of the disclosure, an electronic device may comprise: a display, a processor operatively connected with the display, and a memory operatively connected with the processor. The memory may store instructions that, when executed, cause the electronic device to: receive an input while displaying a screen through the display, obtain at least one first tag related to the screen by performing a first recognition operation on the screen based on the input, display a first user interface including the at least one first tag through the display, obtain at least one second tag through a second recognition operation on the screen performed by an external electronic device (e.g., the server 108) connected with the electronic device and continuous from the first recognition operation while the first user interface is displayed, and display a second user interface including the obtained at least one second tag through the display.

In various example embodiments, the instructions, when executed, may cause the electronic device to: identify a function related to at least one of the at least one second tag or the at least one first tag and display the first user interface or the second user interface including an object indicating the identified function through the display.

In various example embodiments, the instructions, when executed, may enable the electronic device to: store the at least one first tag in the memory in response to an input received while the second recognition operation is performed, obtain at least one second tag as the second recognition operation is completed after the at least one first tag is stored, and store, in the memory, the obtained at least one second tag along with the at least one first tag.

Figure 2:
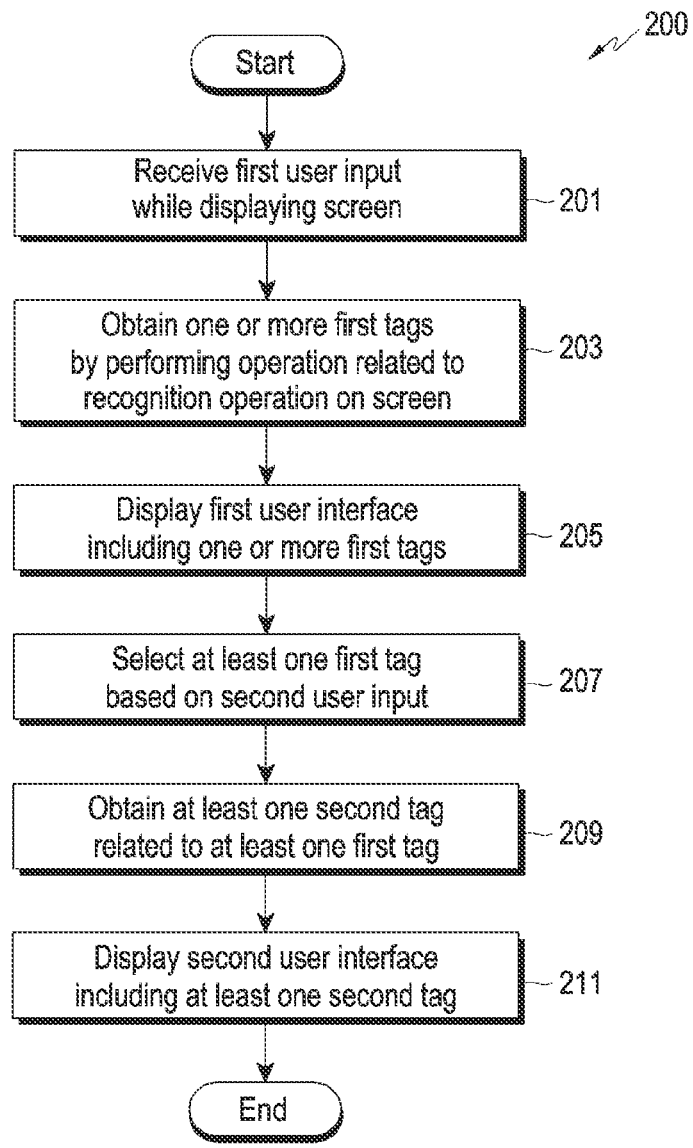
FIG. 2 is a flowchart illustrating an example method for providing a tag by an electronic device according to various embodiments.

FIG. 2 is a flowchart 200 illustrating an example method for providing a tag by an electronic device 101 according to various embodiments.

Referring to FIG. 2, in operation 201, in an embodiment, the processor 120 may receive a first user input while displaying a screen through a display (e.g., the display device 160).

In an embodiment, the processor 120 may receive a first user input for recognizing the screen currently displayed through the display (or for obtaining a tag by recognizing the currently displayed screen).

In an embodiment, after obtaining (or generating) an image (e.g., captured screen or screen shot) for the screen (hereinafter, referred to as a 'first screen') currently displayed through the display based on the first user input, the processor 120 may receive the first user input for recognizing an image (hereinafter, referred to as a 'first image') for the obtained screen.

In an embodiment, the processor 120 may receive one first user input (e.g., a user input received once) to obtain the first image and perform recognition on the first image. For example, the processor 120 may obtain the first image while displaying the first screen and receive one first user input to perform the operation for recognizing the first image (or operation for obtaining a tag) continuously from the operation of obtaining the first image.

In an embodiment, the processor 120 may receive the first user input for recognizing the first screen without obtaining the first image (e.g., without generating a captured screen for the first screen). For example, when a webpage is displayed through the display, the processor 120 may receive a first user input for recognizing at least one of text or an image included in the webpage from the source data (e.g., source code) of the webpage (or for obtaining a tag by recognizing at least one of text or an image) without capturing the webpage (e.g., without generating a captured screen for the webpage).

In an embodiment, in the above-described embodiments, receiving the first user input for recognizing the screen currently displayed through the display is illustrated by way of non-limiting example, but embodiments are not limited thereto. For example, when the screen displayed through the display is a portion of one page (e.g., webpage), the processor 120 may receive a first user input for recognizing one page (e.g., a portion of one page displayed through the display and the rest of the one page not displayed through the display).

In operation 203, in an embodiment, the processor 120 may obtain one or more first tags by performing an operation related to the recognition operation on the screen based on the first user input.

In an embodiment, the processor 120 may perform at least part of the recognition operation on the screen, as the operation related to the recognition operation on the screen (e.g., first screen).

In an embodiment, a plurality of recognition operations for recognizing the screen may be consecutively (or stepwise) performed through at least one of the electronic device 101 or an external electronic device (e.g., the server 108). In an embodiment, each of the plurality of recognition operations may be a recognition operation capable of obtaining a tag whenever each of the plurality of recognition operation is performed. For example, when the screen displayed through the display includes text, the plurality of recognition operations may include a recognition operation for obtaining a tag (e.g., keyword) from the text and a recognition operation for obtaining a new tag by searching for information related to the obtained tag continuously from the operation of obtaining the tag from the text.

In an embodiment, each of the plurality of recognition operations for recognizing the screen may include at least one operation. For example, when the first screen includes text, the one recognition operation may include the operation of generating a first image (e.g., captured screen) from the first screen, the operation of extracting at least one text from the first image using an optical character reader (OCR) program, and the operation of determining a tag (e.g., keyword) based on at least one extracted text.

The tag obtained through a plurality of recognition operations for recognizing the screen may, for example, be referred to below as a 'first tag.' Further, among the plurality of recognition operations, the recognition operation first performed is denoted as a 'first recognition operation,' and the tag obtained through the first recognition operation (or as a result of the first recognition operation) is denoted as a '1-1th tag.' Further, the recognition operation performed continuously from the first recognition operation is denoted as a 'second recognition operation,' and the tag obtained through the second recognition operation (or as a result of the second recognition operation) is denoted as a '1-2th tag.' However, the plurality of recognition operations for recognizing the screen are not limited to the first recognition operation and the second recognition operation and may further include one or more recognition operations (e.g., third recognition operation) performed continuously after the first recognition operation and the second recognition operation.

In an embodiment, in the above-described example, the operation for recognizing the screen is illustrated by way of non-limiting example as including the plurality of recognition operations, but embodiments are not limited thereto. For example, the operation for recognizing the screen may include only one recognition operation (e.g., the first recognition operation).

In an embodiment, the first recognition operation may include at least one recognition operation performed by the electronic device 101. For example, when the electronic device 101 includes a component (e.g., neural processing unit (NPU)) capable of performing an artificial intelligence function, the first recognition operation may include at least one recognition operation performed by the component capable of performing the artificial intelligence function. As another example, the first recognition operation may include at least one recognition operation performed using a component (e.g., OCR program or image recognition program) capable of recognizing the screen, included in the electronic device 101, other than the component capable of performing the artificial intelligence function. As another example, the first recognition operation may include at least one recognition operation performed through a component capable of performing a screen recognition operation and a component capable of performing an artificial intelligence function, which are included in the electronic device 101.

In an embodiment, the second recognition operation may include at least one recognition operation performed by an external electronic device (e.g., the server 108) connected with the electronic device 101. For example, when the first recognition operation is a recognition operation performed by the NPU included in the electronic device 101, the second recognition operation performed continuously from the first recognition operation may be at least one recognition operation performed through the external electronic device (e.g., the server 108) including a component capable of performing an artificial intelligence function.

However, embodiments of the disclosure are not limited thereto. For example, both the first recognition operation and the second recognition operation may be performed by the electronic device 101 or the external electronic device (e.g., the server 108).

In an embodiment, the second recognition operation may include a detailed recognition operation of the first recognition operation. For example, when the screen includes an image (e.g., when the screen includes an image for the user), the first recognition operation may be an operation for recognizing the type of the object (e.g., a person) included in the image, and the second recognition operation may be an operation for recognizing a specific target (e.g., the user) corresponding to the object included in the image.

In an embodiment, the first recognition operation may be an operation for obtaining a tag having a hypernym (or broader concept), and the second recognition operation may include an operation for obtaining a tag having a hyponym (or more specific concept) belonging to the higher-level term of the tag obtained through the first recognition operation. For example, when the screen includes an image (e.g., when the screen includes an image for a specific mobile phone), the first recognition operation may be an operation for obtaining a tag (e.g., mobile phone) having a hypernym for the image, and the second recognition operation may be an operation for obtaining a tag (e.g., the name of the mobile phone) having a hyponym belonging to the hypernym of the tag.

In an embodiment, the first recognition operation may include an operation for recognizing the name (e.g., web application) of an application related to the screen. In an embodiment, when the screen of a website is displayed through the display, the first recognition operation may include an operation for recognizing the address of the website. In an embodiment, the first recognition operation may include an operation for recognizing the name of content (e.g., title of content) included in the screen displayed through the display.

In an embodiment, the first recognition operation may include an operation for recognizing the type of the screen. In an embodiment, when a home screen is displayed through the display, the first recognition operation may include an operation for recognizing the home screen as the currently displayed screen.

In an embodiment, the first recognition operation may include an operation for obtaining a tag based on the user's input log related to the tag for the electronic device 101. For example, the first recognition operation may include an operation for obtaining, as a tag, keywords that the user has input to the electronic device 101 recently (e.g., within one week from the current time as a designated period). As another example, the first recognition operation may include an operation for obtaining, as a tag, keywords that the user has input to the electronic device 101 a designated number of times or more (e.g., three or more times) within a designated period. However, embodiments of the disclosure are not limited thereto. For example, when information about the user's input log related to the tag for the electronic device 101 is stored in the external electronic device (e.g., the server 108) related to the electronic device 101 using the account of the user of the electronic device 101, the operation for obtaining the tag based on the user's input log related to the tag for the electronic device 101 may be performed through the external electronic device (e.g., the server 108).

In an embodiment, the processor 120 may perform a partial operation of recognition operation on the screen. In an embodiment, when the recognition operations for the screen include the first recognition operation and the second recognition operation, the processor 120 may perform a partial operation of the first recognition operation on the screen or a partial operation of the first recognition operation and a partial operation of the second recognition operation. For example, for the first recognition operation on the screen, the processor 120 may perform some operations among the operations included in the first recognition operation and transmit information (or result) about the partial operations, which the processor 120 has performed, to the external electronic device (e.g., the server 108) through the communication module 190 so that the remaining operations included in the first recognition operation are performed by the external electronic device (e.g., the server 108). The processor 120 may receive the information about the result of the remaining partial operations included in the first recognition operation performed by the external electronic device (e.g., the server 108) through the communication module 190. As another example, when the recognition operation on the screen includes only the first recognition operation, the processor 120 may perform some operations of the first recognition operation.

In an embodiment, the processor 120 may perform operations related to the recognition operation on the screen, obtaining one or more first tags. For example, the processor 120 may obtain one or more first tags as a result of the recognition operation on the screen.

In an embodiment, when the recognition operation on the screen includes a plurality of recognition operations, the processor 120 may obtain one or more first tags continuously (or sequentially) as each of the plurality of recognition operations is completed. For example, as the first recognition operation is completed, the processor 120 may obtain the 1-1th tag and, as the second recognition operation performed continuously from the first recognition operation is completed, obtain the 1-2th tag.

In an embodiment, the processor 120 may obtain one or more tags based on the attribute of the screen. For example, when the screen includes a screen related to a contacts application, the processor 120 may obtain, as one or more tags, a keyword related to contacts (e.g., the user's nickname registered on the contacts or a term representing the title of the user registered on the contacts). As another example, when the screen includes a screen related to a map application, the processor 120 may obtain keywords related to a geographic location included in the map (e.g., the location of a famous restaurant related to a geographic location), as one or more tags. However, the method for obtaining one or more tags based on the attribute of the screen is not limited thereto.

In operation 205, in an embodiment, the processor 120 may display a first user interface including one or more first tags through the display.

In an embodiment, when the recognition operation on the screen includes a plurality of recognition operations and, as each of the plurality of recognition operations is completed, one or more first tags are continuously (or sequentially) obtained, the processor 120 may display, through the display, the first user interface including the first tag obtained whenever the first tag is obtained. For example, the processor 120 may obtain the 1-1th tag as a result of the first recognition operation and display the first user interface including the obtained 1-1th tag through the display. When obtaining the 1-2th tag as a result of the second recognition operation while displaying the first user interface including the 1-1th tag, the processor 120 may display, through the display, the first user interface including the 1-1th tag and the 1-2th tag.

In an embodiment, the processor 120 may change the 1-1th tag into the 1-2th tag. In an embodiment, when the screen includes an image, the processor 120 may obtain the 1-1th tag by performing the first recognition operation on the image and, after performing the second recognition operation on the image, change the 1-1th tag into the 1-2th tag. For example, when the screen includes an image (e.g., a quick response (QR) code image) including a specific pattern (or configured in a specific pattern), the processor 120 may obtain the target (e.g., QR code) represented by the image, as the 1-1th tag. The processor 120 may obtain, as the 1-2th tag, information (e.g., information obtained by analyzing the QR code) represented by the specific pattern by analyzing the specific pattern included in the image. The processor 120 may remove (or cause to disappear) the 1-1th tag included in the first user interface and display the 1-2th tag. For example, the processor 120 may display the 1-2th tag, instead of the 1-1th tag, in the position where the 1-1th tag used to be displayed in the first user interface.

In an embodiment, when the recognition operation on the screen includes a plurality of recognition operations, after the plurality of recognition operations all are completed, the processor 120 may display, through the display, the first user interface including one or more first tags (e.g., first tags including the 1-1th tag and the 1-2th tag) obtained through the plurality of recognition operations.

In an embodiment, the processor 120 may display objects representing one or more first tags through the display. For example, the processor 120 may display the one or more first tags in the form of objects (e.g., icons) through the display.

In an embodiment, each of the objects representing the one or more first tags may include an indicator indicating whether the object is selected by the user. In an embodiment, upon obtaining one or more first tags (e.g., immediately after obtaining one or more first tags), the processor 120 may display an object including an indicator indicating that one or more first tags are not selected by the user, through the display.

In operation 207, in an embodiment, while displaying the first user interface, the processor 120 may select at least one of the one or more first tags included in the first user interface based on a second user input.

In an embodiment, the processor 120 may receive a second user input for selecting at least one of one or more first tags included in the first user interface. For example, the processor 120 may receive a second user input for selecting at least one object among one or more objects respectively representing one or more first tags included in the first user interface.

In an embodiment, the processor 120 may display at least one first tag selected through the display to allow the at least one first tag selected by the second user input to be distinguished from other non-selected first tags. For example, the processor 120 may display (or change) the shape of the indicator through the display, so that the indicator included in at least one object representing at least one selected first tag and indicating whether it is selected by the user indicates that it is selected by the user. As another example, the processor 120 may change at least one of the color, brightness, or saturation of at least one object representing at least one selected first tag. However, the method for displaying at least one first tag selected by the user is not limited to the above-described example.

In an embodiment, before the recognition operation on the screen includes a plurality of recognition operations, and all of the plurality of recognition operations are completed (e.g., when some of the plurality of recognition operations are completed), the processor 120 may select at least one first tag among one or more first tags obtained through the at least one completed recognition operations among the plurality of recognition operations based on the second user input. For example, after obtaining the 1-1th tag through the first recognition operation, and while performing the second recognition operation continuously from the first recognition operation, the processor 120 may select the 1-1th tag based on the second user input. After obtaining the 1-2th tag through the second recognition operation, the processor 120 may further select a 1-2th tag based on the second user input.

In an embodiment, after the recognition operation on the screen includes a plurality of recognition operations, and all of the plurality of recognition operations are completed, the processor 120 may select at least one first tag among one or more first tags based on the second user input.

In operation 209, in an embodiment, the processor 120 may obtain at least one second tag related to the at least one first tag.

In an embodiment, the processor 120 may obtain at least one second tag related to the at least one first tag in response to selection of the at least one first tag.

In an embodiment, the processor 120 may obtain the at least one second tag by searching for information about the at least one first tag through the electronic device 101 or external electronic device (e.g., the server 108) in response to selection of the at least one first tag.

In an embodiment, the processor 120 may further perform the operation of searching for information about the at least one first tag using a web application in response to selection of the at least one first tag. The processor 120 may obtain the at least one second tag based on the searched information about the at least one first tag.

In an embodiment, the processor 120 may identify (or search for) content (e.g., an image) stored (or tagged) in association with the at least one first tag in the memory 130 in response to selection of the at least one first tag. In an embodiment, the processor 120 may obtain, as the at least one second tag, another tag stored in association with content stored in association with the at least one first tag in the memory 130. In an embodiment, information (e.g., name of content) related to the content (e.g., image) stored (or tagged) in association with the at least one first tag in the memory 130 may be obtained as at least one second tag.

In an embodiment, the processor 120 may identify (or search for) content (e.g., post) stored (tagged) in association with the at least one first tag in the external electronic device (e.g., the server 108) providing a web service (e.g., social network service (SNS)) that the user of the electronic device 101 has subscribed to (or registered) using his account, in response to selection of the at least one first tag. In an embodiment, the processor 120 may obtain, as the at least one second tag, another tag stored in association with the content stored in association with the at least one first tag in the external electronic device (e.g., the server 108). In an embodiment, the processor 120 may obtain, as at least one second tag, information (e.g., the name of content or the user who has posted the content) related to the content stored in association with the at least one first tag in the external electronic device (e.g., the server 108).

In an embodiment, the processor 120 may obtain at least one second tag related to the at least one first tag, based on the information obtained through the recognition operation on the screen, in response to selection of the at least one first tag. For example, the processor 120 may obtain (or search for) at least one 1-3th tag related to the 1-1th tag not included in the first user interface (e.g., not recommended to the user), along with the 1-1th tag included in the first user interface through the first recognition operation on the screen. When the 1-1th tag is selected by the second user input, the processor 120 may obtain at least one 1-3th tag as at least one second tag.

However, the method for obtaining at least one second tag related to at least one first tag by the processor 120 is not limited to the above-described example.

In an embodiment, the processor 120 may select at least one first tag among one or more first tags included in the first user interface based on the second user input while displaying the first user interface and then obtain at least one second tag related to the at least one selected first tag based on a third user input. For example, the processor 120 may select at least one first tag based on the second user input and then perform the operation of obtaining at least one second tag related to the at least one selected first tag based on the third user input for selecting an object corresponding (or mapped) to the function of obtaining at least one second tag related to the at least one selected first tag.

In operation 211, in an embodiment, the processor 120 may display a second user interface including at least one second tag through the display. For example, if at least one second tag is obtained while the first user interface including at least one first tag is displayed, the processor 120 may display, through the display, the second user interface (e.g., the second user interface including at least one first tag and at least one second tag) which is the first user interface additionally (or newly) including the at least one second tag.

Although not shown in FIG. 2, in an embodiment, the processor 120 may store the obtained at least one first tag and at least one second tag in the memory 130.

Figure 3:
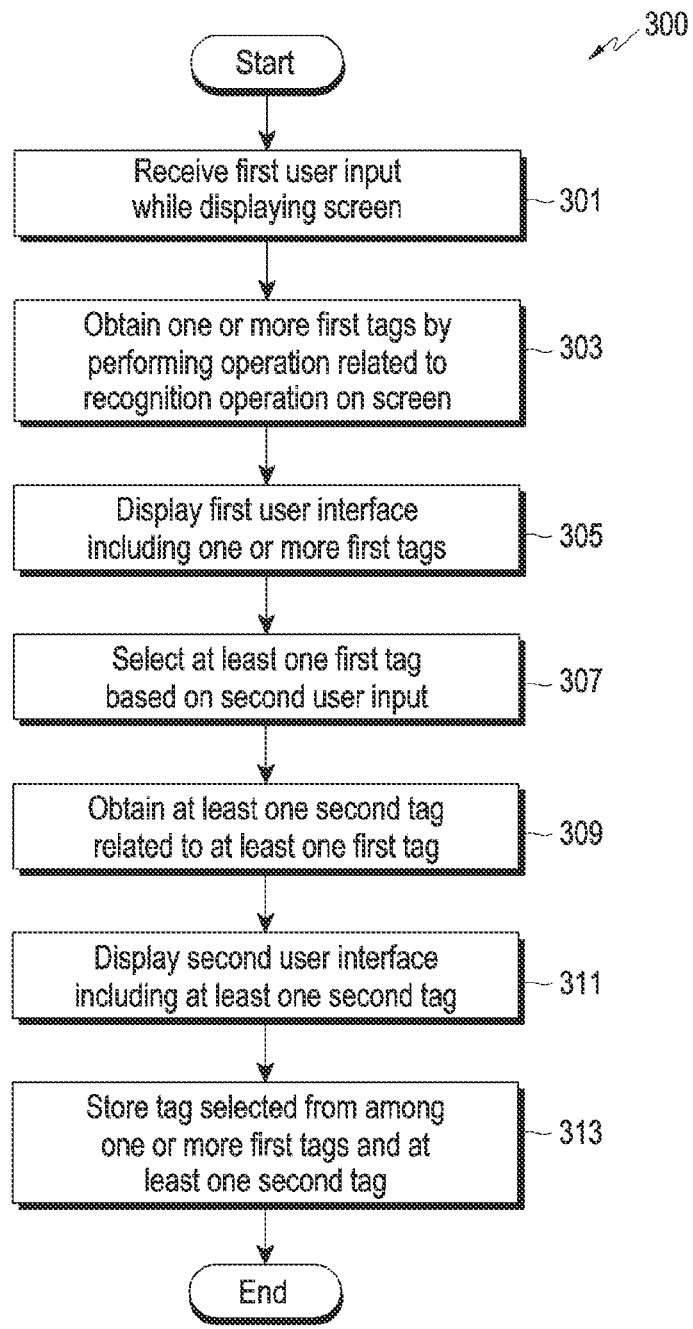
FIG. 3 is a flowchart illustrating an example method for storing an obtained tag according to various embodiments.

FIG. 3 is a flowchart 300 illustrating an example method for storing an obtained tag according to various embodiments.

Referring to FIG. 3, in operation 301, in an embodiment, the processor 120 may receive a first user input while displaying a screen through a display (e.g., the display device 160).

In operation 303, in an embodiment, the processor 120 may obtain one or more first tags by performing an operation related to the recognition operation on the screen based on the first user input.

In operation 305, in an embodiment, the processor 120 may display a first user interface including one or more first tags through the display.

In operation 307, in an embodiment, while displaying the first user interface, the processor 120 may select at least one of the one or more first tags included in the first user interface based on a second user input.

In operation 309, in an embodiment, the processor 120 may obtain at least one second tag related to the at least one first tag.

In operation 311, in an embodiment, the processor 120 may display a second user interface including at least one second tag through the display.

The embodiments of operations 301 to 311 of FIG. 3 are at least partially the same or similar to the embodiments of operations 201 to 211 of FIG. 2.

In operation 313, in an embodiment, the processor 120 may store the tag selected from among the one or more first tags and at least one second tag displayed through the display, in the memory 130.

In an embodiment, the processor 120 may store, in the memory 130, the tag selected by the user from among one or more objects representing the one or more first tags displayed through the display and at least one object representing at least one second tag. For example, at least one first tag among the one or more first tags displayed through the display may be in a state of having been selected by the user through operation 307. The processor 120 may maintain selection of at least one first tag or release the selection of the at least one first tag by receiving a user input to the at least one first tag. The processor 120 may select the first tag not selected through operation 307 among one or more first tags based on a user input. The processor 120 may select one or more second tags based on a user input from among at least one second tag obtained through operation 311. The processor 120 may store at least one tag remaining selected, the tag selected from among one or more first tags, and one or more second tags selected from among the at least one second tag, in the memory 130, based on a user input.

In an embodiment, the processor 120 may store the tag selected from among the at least one second tag and one or more first tags, along with (or in association with or mapped with) the first image (e.g., the captured image for the screen currently displayed through the display), in the memory 130.

In an embodiment, upon receiving a user input for storing the selected tag in a state in which some recognition operations of the recognition operation on the screen or some operations of the obtain of obtaining at least one second tag are not completed, the processor 120 may store the tag obtained through some completed recognition operations or some operations and selected by a user input in the memory 130. For example, the processor 120 may perform a first recognition operation on the screen and display the 1-1th tag obtained through the first recognition operation through the display. Upon receiving a user input for selecting and storing the 1-1th tag while performing the second recognition operation continuous from the first recognition operation (e.g., before obtaining the 1-2th tag), the processor 120 may stop the second recognition operation and store the 1-1th tag in the memory 130.

In an embodiment, upon receiving a user input for storing the selected tag in a state in which some recognition operations of the recognition operation on the screen or some operations of the obtain of obtaining at least one second tag are not completed, the processor 120 may continuously perform the incomplete some recognition operations or some operations and store the tag obtained through the some recognition operations or some operations, continuously performed and thus completed, along with the selected tag, in the memory 130. For example, upon receiving a user input for storing the selected tag in a state in which the second recognition operation continuous from the first recognition operation on the screen is not completed, the processor 120 may store the selected tag in the memory 130 and continuously perform the incomplete second recognition operation. Upon obtaining the 1-2th tag by continuously performing the incomplete second recognition operation, the processor 120 may store the obtained 1-2th tag along with the selected tag previously stored in the memory 130.

Figure 4:
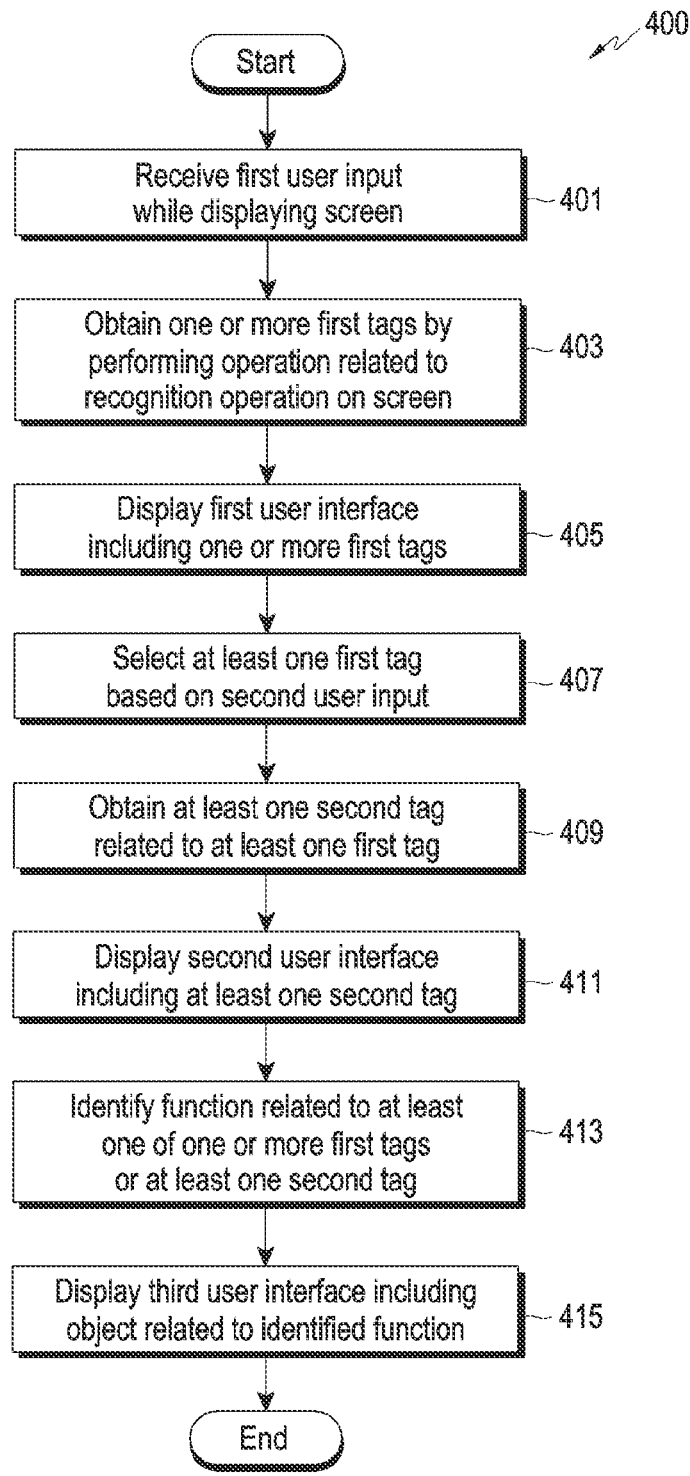
FIG. 4 is a flowchart illustrating an example method for providing a function related to a tag by an electronic device according to various embodiments.

FIG. 4 is a flowchart 400 illustrating an example method for providing a function related to a tag by an electronic device 101 according to various embodiments.

Referring to FIG. 4, in operation 401, in an embodiment, the processor 120 may receive a first user input while displaying a screen through a display (e.g., the display device 160).

In operation 403, in an embodiment, the processor 120 may obtain one or more first tags by performing an operation related to the recognition operation on the screen based on the first user input.

In operation 405, in an embodiment, the processor 120 may display a first user interface including one or more first tags through the display.

In operation 407, in an embodiment, while displaying the first user interface, the processor 120 may select at least one of the one or more first tags included in the first user interface based on a second user input.

In operation 409, in an embodiment, the processor 120 may obtain at least one second tag related to the at least one first tag.

In operation 411, in an embodiment, the processor 120 may display a second user interface including at least one second tag through the display.

The embodiments of operations 401 to 411 of FIG. 4 are at least partially the same or similar to the embodiments of operations 201 to 211 of FIG. 2.

In operation 413, in an embodiment, the processor 120 may identify the function related to at least one of one or more first tags or at least one second tag.

In an embodiment, the processor 120 may identify the function of the application related to at least one of the one or more first tags or at least one second tag. For example, when the at least one of the one or more first tags or at least one second tag includes a specific person name, the processor 120 may identify the function of the contacts application as the function of the application related to the specific person name. As another example, when the at least one of the one or more first tags or at least one second tag includes a specific geographical location name, the processor 120 may identify the function of the map application as the function of the application related to the specific geographical location. As another example, when the at least one of the one or more first tags or at least one second tag includes a product name, the processor 120 may identify the function of the navigation application where the place where the product is sold is the destination, as the function of the application related to the product.

In an embodiment, the processor 120 may identify the function of the application capable of storing, in association, the tag selected from among at least one of the one or more first tags or at least one second tag. For example, when at least one of the one or more first tags or at least one second tag is selected by the user, the processor 120 may identify the function for storing the selected at least one to correspond to the user account of the electronic device 101 of the SNS application.

However, the function of the application related to the at least one of the one or more first tags or at least one second tag is not limited to the above-described examples.

In an embodiment, the processor 120 may identify the function related to the selected tag from among the at least one of the one or more first tags or at least one second tag. For example, upon receiving a user input for selecting at least one of the one or more first tags or at least one second tag while displaying the second user interface including one or more first tags and at least one second tag through the display, the processor 120 may identify the function related to the selected at least one.

In operation 415, in an embodiment, the processor 120 may display a third user interface including the object related to the identified function through the display.

In an embodiment, the processor 120 may display the third user interface including the object representing the identified function (or object mapped to the identified function) along with the at least one of the one or more first tags or at least one second tag. For example, the processor 120 may display, through the display, the third user interface further including the object representing the identified function in the first interface or second interface. As another example, the processor 120 may display, through the display, the third user interface including the object representing the identified function, in the object representing the tag related to the identified function and included in the first interface or second interface.

In an embodiment, although not shown in FIG. 4, when a user input to the object representing the identified function is input, the processor 120 may execute the identified function.

Figure 5:
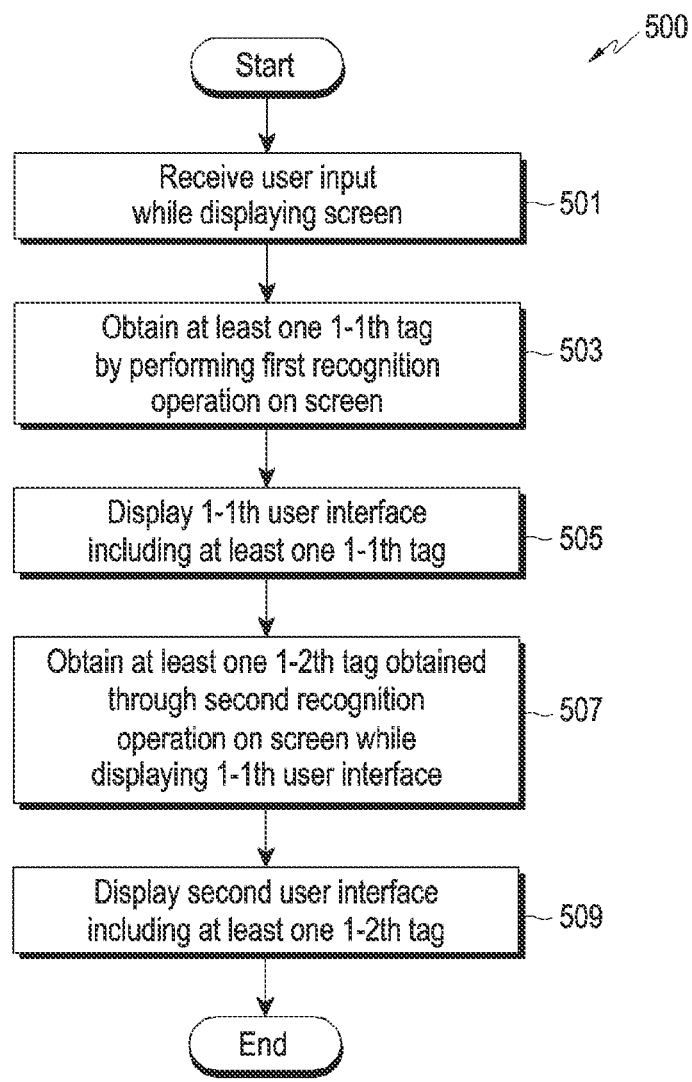
FIG. 5 is a flowchart illustrating an example method for providing a tag by an electronic device according to various embodiments.

FIG. 5 is a flowchart 500 illustrating an example method for providing a tag by an electronic device 101 according to various embodiments.

Referring to FIG. 5, in operation 501, in an embodiment, the processor 120 may receive a user input while displaying a screen through a display (e.g., the display device 160).

In an embodiment, the processor 120 may receive a user input for recognizing the screen currently displayed through the display (or for obtaining a tag by recognizing the currently displayed screen).

In an embodiment, the processor 120 may obtain (or generate) an image (or first image) for the screen (or first screen) currently displayed through the display, based on the user input and then receive a user input for recognizing the image for the obtained screen.

In an embodiment, the processor 120 may receive one user input (e.g., a user input received once) to obtain the first image and perform recognition on the first image. For example, the processor 120 may obtain the first image while displaying the first screen and receive one user input to start the operation for recognizing the first image (or operation for obtaining a tag) continuously from the operation of obtaining the first image.

In an embodiment, the processor 120 may receive the user input for recognizing the first screen without obtaining the first image (e.g., without generating a captured screen for the first screen). For example, when a webpage is displayed through the display, the processor 120 may receive a user input for recognizing at least one of text or an image included in the webpage from the source data (e.g., source code) of the webpage (or for obtaining a tag by recognizing at least one of text or an image) without capturing the webpage (e.g., without generating a captured screen for the webpage).

In an embodiment, in the above-described embodiments, receiving the user input for recognizing the screen currently displayed through the display is illustrated by way of non-limiting example, but embodiments are not limited thereto. For example, when the screen displayed through the display is a portion of one page (e.g., webpage), the processor 120 may receive a user input for recognizing one page (e.g., a portion of one page displayed through the display and the rest of the one page not displayed through the display).

In operation 503, in an embodiment, the processor 120 may obtain at least one 1-1th tag related to the screen by performing the first recognition operation on the screen based on the user input.

In an embodiment, the processor 120 may perform the first recognition operation on the screen in response to receiving the user input.

In an embodiment, the first recognition operation may include at least one recognition operation performed by the electronic device 101. For example, when the electronic device 101 includes a component (e.g., neural processing unit (NPU)) capable of performing an artificial intelligence function, the first recognition operation may include at least one recognition operation performed by the component capable of performing the artificial intelligence function. As another example, the first recognition operation may include at least one recognition operation performed using a component (e.g., OCR program or image recognition program) capable of recognizing the screen, included in the electronic device 101, other than the component capable of performing the artificial intelligence function. As another example, the first recognition operation may include at least one recognition operation performed through a component capable of performing a screen recognition operation and a component capable of performing an artificial intelligence function, which are included in the electronic device 101.

In an embodiment, the second recognition operation may include at least one recognition operation performed by an external electronic device (e.g., the server 108) connected with the electronic device 101. For example, when the first recognition operation is a recognition operation performed by the NPU included in the electronic device 101, the second recognition operation performed continuously from the first recognition operation may be at least one recognition operation performed through the external electronic device (e.g., the server 108) including a component capable of performing an artificial intelligence function.

In an embodiment, the second recognition operation may include a detailed recognition operation of the first recognition operation. For example, when the screen includes an image (e.g., when the screen includes an image for the user), the first recognition operation may be an operation for recognizing the type of the object (e.g., a person) included in the image, and the second recognition operation may be an operation for recognizing a specific target (e.g., the user) corresponding to the object included in the image.

In an embodiment, the first recognition operation may be an operation for obtaining a tag having a hypernym (or broader concept), and the second recognition operation may include an operation for obtaining a tag having a hyponym (or more specific concept) belonging to the higher-level term of the tag obtained through the first recognition operation.

In an embodiment, the first recognition operation may include an operation for recognizing the name (e.g., web application) of an application related to the screen. In an embodiment, when the screen of a website is displayed through the display, the first recognition operation may include an operation for recognizing the address of the website. In an embodiment, the first recognition operation may include an operation for recognizing the name of content (e.g., title of content) included in the screen displayed through the display.

In an embodiment, the first recognition operation may include an operation for obtaining a tag based on the user's input log related to the tag for the electronic device 101. For example, the first recognition operation may include an operation for obtaining, as a tag, keywords that the user has input to the electronic device 101 recently (e.g., within one week from the current time as a designated period). As another example, the first recognition operation may include an operation for obtaining, as a tag, keywords that the user has input to the electronic device 101 a designated number of times or more (e.g., three or more times) within a designated period. However, embodiments of the disclosure are not limited thereto. For example, when information about the user's input log related to the tag for the electronic device 101 is stored in the external electronic device (e.g., the server 108) related to the electronic device 101 using the account of the user of the electronic device 101, the operation for obtaining the tag based on the user's input log related to the tag for the electronic device 101 may be performed through the external electronic device (e.g., the server 108).

In an embodiment, the processor 120 may obtain at least one 1-1th tag by performing the first recognition operation on the screen.

In operation 505, in an embodiment, the processor 120 may display a 1-1th user interface including at least one 1-1th tag through the display.

In an embodiment, when the 1-1th recognition operation on the screen includes a plurality of recognition operations and, as each of the plurality of recognition operations is completed, at least one 1-1th tag is continuously (or sequentially) obtained, the processor 120 may display, through the display, the 1-1th user interface including the 1-1th tag obtained whenever the 1-1th tag is obtained. For example, the processor 120 may obtain the 1-1-1th tag as a result of the 1-1th recognition operation included in the first recognition operation and display the 1-1-1th user interface including the obtained 1-1-1th tag through the display. When obtaining the 1-1-2th tag as a result of the 1-2th recognition operation continuous from the 1-1th recognition operation while displaying the 1-1-1th user interface including the 1-1-1th tag, the processor 120 may display, through the display, the 1-1-2th user interface including the 1-1-1th tag and the 1-1-2th tag.

In an embodiment, when the first recognition operation on the screen includes a plurality of recognition operations, after the plurality of recognition operations all are completed, the processor 120 may display, through the display, the 1-1th user interface including at least one 1-1th tag obtained through the plurality of recognition operations.

In an embodiment, the processor 120 may display objects representing at least one 1-1th tag through the display. For example, the processor 120 may display the at least one 1-1th tag in the form of objects (e.g., icons) through the display.

In an embodiment, each of the objects representing the at least one 1-1th tag may include an indicator indicating whether the object is selected by the user. In an embodiment, upon obtaining at least one 1-1th tag (e.g., immediately after obtaining the at least one 1-1th tag), the processor 120 may display an object including an indicator indicating that at least one 1-1th tag is not selected by the user, through the display.

In operation 507, in an embodiment, the processor 120 may obtain at least one 1-2th tag through the second recognition operation on the screen, performed by the external electronic device (e.g., the server 108), and continuous from the first recognition operation, while displaying the 1-1th user interface through the display.

In an embodiment, after performing the first recognition operation, the processor 120 may transmit information required for the external electronic device (e.g., the server 108) to perform the second recognition operation to the external electronic device (e.g., the server 108) through the communication module 190. For example, the processor 120 may transmit information about at least one 1-1th tag obtained as a result of performing the first recognition operation through the communication module 190 to the external electronic device (e.g., the server 108). As another example, the processor 120 may transmit information about information about the screen (e.g., the captured image for the screen or the source code for the screen) through the communication module 190 to the external electronic device (e.g., the server 108).

In an embodiment, although not shown in FIG. 5, the external electronic device (e.g., the server 108) may perform the second recognition operation based on information necessary to perform the second recognition operation, received from the electronic device 101.

In an embodiment, the processor 120 may receive the 1-2th tag generated through the second recognition operation, through the communication module 190 from the external electronic device (e.g., the server 108).

In an embodiment, when the second recognition operation on the screen includes a plurality of recognition operations, the processor 120 may receive, from the external electronic device (e.g., the server 108) through the communication module 190, at least one 1-2th tag generated continuously (or sequentially) as each of the plurality of recognition operations performed by the external electronic device (e.g., the server 108) is completed.

In an embodiment, when the second recognition operation on the screen includes a plurality of recognition operations, the processor 120 may receive, from the external electronic device (e.g., the server 108) through the communication module 190, at least one 1-2th tag generated as all of the plurality of recognition operations performed by the external electronic device (e.g., the server 108) are completed.

In operation 509, in an embodiment, the processor 120 may display a 1-2th user interface including the obtained at least one 1-2th tag through the display.

In an embodiment, upon receiving, from the external electronic device (e.g., the server 108) through the communication module, at least one 1-2th tag generated continuously (or sequentially) as each of the plurality of recognition operations performed by the external electronic device (e.g., the server 108) is completed, the processor 120 may display a 1-2th user interface including the 1-2th tag obtained whenever the 1-2th tag is obtained, through the display. For example, the processor 120 may obtain the 1-2-1th tag as a result of the 2-1th recognition operation included in the second recognition operation and display the 1-2-1th user interface including the obtained 1-2-1th tag through the display. When obtaining the 1-2-2th tag as a result of the 2-2th recognition operation continuous from the 2-1th recognition operation while displaying the 1-2-1th user interface including the 1-2-1th tag, the processor 120 may display, through the display, the 1-2-2th user interface including the 1-2-1th tag and the 1-2-2th tag.

In an embodiment, the processor 120 may change the 1-1th tag into the 1-2th tag. In an embodiment, when the screen includes an image, the processor 120 may obtain the 1-1th tag by performing the first recognition operation on the image and, after performing the second recognition operation on the image, change the 1-1th tag into the 1-2th tag. For example, when the screen includes an image (e.g., a quick response (QR) code image) including a specific pattern (or configured in a specific pattern), the processor 120 may obtain the target (e.g., QR code) represented by the image, as the 1-1th tag. The processor 120 may obtain, as the 1-2th tag, information (e.g., information obtained by analyzing the QR code) represented by the specific pattern by analyzing the specific pattern included in the image. The processor 120 may remove (or cause to disappear) the 1-1th tag included in the first user interface and display the 1-2th tag. For example, the processor 120 may display the 1-2th tag, instead of the 1-1th tag, in the position where the 1-1th tag used to be displayed in the first user interface.

In an embodiment, when the second recognition operation on the screen includes a plurality of recognition operations, after the plurality of recognition operations all are completed, the processor 120 may display, through the display, the 1-2th user interface including at least one 1-2th tag obtained through the plurality of recognition operations.

In an embodiment, the processor 120 may display objects representing at least one 1-2th tag through the display. For example, the processor 120 may display the at least one 1-2th tag in the form of objects (e.g., icons) through the display.

In an embodiment, each of the objects representing the at least one 1-2th tag may include an indicator indicating whether the object is selected by the user. In an embodiment, upon obtaining at least one 1-2th tag (e.g., immediately after obtaining the at least one 1-2th tag), the processor 120 may display an object including an indicator indicating that at least one 1-2th tag is not selected by the user, through the display.

In an embodiment, the processor 120 may display a 1-2th user interface including at least one 1-1th tag and at least one 1-2th tag through the display.

Although not shown in FIG. 5, FIG. 5 may further include an operation at least partially identical or similar to the operation of obtaining at least one second tag by selecting at least one first tag and displaying the second user interface including the at least one second tag, as described in detail above in connection with operations 209 and 211 of FIG. 2.

Although not shown in FIG. 5, in an embodiment, the processor 120 may store the obtained at least one first tag and at least one second tag.

Although not shown in FIG. 5, FIG. 5 may further include an operation at least partially identical or similar to the operation of identifying a function related to at least one of at least one second tag or one or more first tags and displaying a third user interface including the object related to the identified function, as described in detail above in connection with operations 413 and 415 of FIG. 4.

FIG. 6 is a diagram 600 illustrating an example method for providing a tag related to text according to various embodiments.

Referring to FIG. 6, in an embodiment, when the screen includes text 1, such as 'A coffee adds its fourth local cafe,' the processor 120 may obtain a keyword, such as 'ACoffee,' as the 1-1th tag. The processor 120 provides the company name of 'ACoffee', such as 'A,' and information about the branch of 'ACoffee,' such as 'A Sungsujeom' (e.g., information about the 'ACoffee' branch closest to the current location of the electronic device 101) as the 1-2th tag. The processor 120 may obtain information about the history of company A, such as 'A_history,' and contact information about the branch 'ACoffee,' such as 'A Sungujeom_phone number,' as the second tag. The processor 120 may identify a location recommendation function (e.g., a function of a map application) as a function related to at least one of the 1-1th tag, 1-2th tag, or second tag and display an object mapped to the location recommendation function through the display.

In an embodiment, when the screen includes text 2, such as 'B company is working through its "C process" to figure out what to do about deepfakers,' the processor 120 may obtain a keyword, such as 'Bcompany,' as the 1-1th tag. The processor 120 may obtain the name of the organization having the news article related to the name of the representative of company B, such as 'D,' and the representative of company B, such as 'E,' as the 1-2th tag. The processor 120 may obtain a tag related to a quote of the representative of company B, such as 'quote D,' and a tag related to the property of the representative of company B, such as 'property D,' as second tags.

In an embodiment, when the screen includes text 3, such as 'Only those woh will risk going too far can possibly find out how far one can go," the processor 120 may obtain a keyword, such as 'maxim,' representing that text 3 is a maxim, as the 1-1th tag. The processor 120 may obtain the name of the person related to text 3, such as 'TSEliot,' as the 1-2th tag. The processor 120 may obtain the life of the person related to text 3, such as 'TSEliot_life,' and the work of the person related to text 3, such as 'Thewasteland,' as the second tags.

In an embodiment, when the screen includes text 4, such as "night mode" of Galaxy S10 series optimized for night photography,' the processor 120 may obtain keywords, such as 'Galaxy S10' and 'night mode,' as the 1-1th tags. The processor 120 may obtain 'Galaxy S10 Note' as a product related to the Galaxy S10 and 'how to set up_night mode,' related to the function of 'night mode' as the second tags. As a function related to at least one of the 1-1th tag or the second tag, the processor 120 may identify the night mode function and display an object capable of immediately executing the night mode function through the display.

FIG. 7 is a diagram 700 illustrating an example method for providing a tag related to an image according to various embodiments.

Referring to FIG. 7, in an embodiment, when the screen includes image 1 representing the scene that actor F is singing a song, the processor 120 may recognize that the object included in the scene corresponds to a person and recognize the person's gender and motion, thereby obtaining 'Singing_Man' as the 1-1th tag. The processor 120 may obtain 'F' which represents the actor's name and 'I' which represents the work related to the scene, as the 1-2th tags. The processor 120 may obtain 'H' which represents the title of the movie starring movie actor F and 'I' which represents the title of the music album of movie actor F as the second tags. The processor 120 may identify a function capable of reserving the movie starring movie actor F as a function related to at least one of the 1-1th tag, 1-2th tag, or second tag and display an object capable of executing the identified function through the display.

In an embodiment, when the screen includes image 2 representing the user's smiling mother, the processor 120 may recognize that the object included in image 2 corresponds to a person and recognize the person's gender and facial expression, thereby obtaining 'SmileWoman' as the 1-1th tag. The processor 120 may 'MyMom' representing the relationship between the user of the electronic device 101 and the recognized person as the 1-2th tag. The processor 120 may obtain 'mother contact' as information related to 'MyMom' as the second tag. The processor 120 may identify a function of a shortcut to the mother contact as a function related to at least one of the 1-1th tag, 1-2th tag, or second tag and display an object capable of executing the identified function through the display.

In an embodiment, when the screen includes image 3 representing sunset over EungBongSan, the processor 120 may recognize that image 3 represents a landscape, thus obtaining 'landscape' as the 1-1th tag. The processor 120 may obtain 'Sunset' as the detailed landscape (e.g., sunset) shown by image 3 and 'EungBongSan' as the geographical name (e.g., EungBongSan) corresponding to the object included in image 3, as the 1-2th tags. The processor 120 may obtain 'EungBongSan_night view' and 'EungBongSan_parking lot,' as information related to 'EungBongSan,' as the second tags. The processor 120 may identify a location recommendation function (e.g., a map application or navigation application function) as a function related to at least one of the 1-1th tag, 1-2th tag, or second tag and display an object capable of executing the identified function through the display.

In an embodiment, when the screen includes image 4 representing a shrimp food, the processor 120 may recognize that image 4 corresponds to a food, thus obtaining 'food' as the 1-1th tag. The processor 120 may obtain 'Gambas,' 'GambasAlAjillo,' and 'SpanishGarlicShrimp' as kinds (or menu) of shrimp foods, as the 1-2th tags. The processor 120 may obtain 'restaurant J' and 'restaurant K' as information about places serving shrimp foods, as the second tags. The processor 120 may identify a function of recommending a restaurant as a function related to at least one of the 1-1th tag, 1-2th tag, or second tag and display an object capable of executing the identified function through the display.

In an embodiment, when the screen includes image 5 captured at night, the processor 120 may recognize that image 5 is captured at night, thus obtaining 'night' as the 1-1th tag. The processor 120 may obtain 'L' representing the place related to a night view, as the second tag. As a function related to at least one of the 1-1th tag or the second tag, the processor 120 may identify the night mode function and display an object capable of executing the identified function through the display.

In an embodiment, when the screen includes image 6 representing a performance poster, the processor 120 may recognize representative text of the performance poster, thus obtaining '2020JazzFestival' as the 1-1th tag. The processor 120 may recognize the detailed text of the performance poster, thus obtaining 'May25th' and 'OlympicPark' as the 1-2th tags. The processor 120 may obtain 'M_Festival' as information related to another performance and 'OlympicPark_location' as information about the geographic location, as the second tags. The processor 120 may identify a function for storing a performance-related schedule and a function for reserving a performance ticket as functions related to at least one of the 1-1th tag, 1-2th tag, or second tag and display an object capable of executing the identified functions through the display.

In an embodiment, when the screen includes image 7 representing a QR code, the processor 120 may obtain 'QR' representing that the object represented by image 7 corresponds to the QR code and 'QR_code' as the 1-1th tags. The processor 120 may obtain 'article,' 'internet,' and 'payment' as the 1-2th tags according to information obtained by analyzing the QR code. The processor 120 may obtain 'QR_code_scan method' and 'QR_code_type' as information related to the QR code, as the second codes. The processor 120 may identify an Internet function and a payment function as functions related to at least one of the 1-1th tag, 1-2th tag, or second tag and display an object capable of executing the identified functions through the display.

Figure 8A:
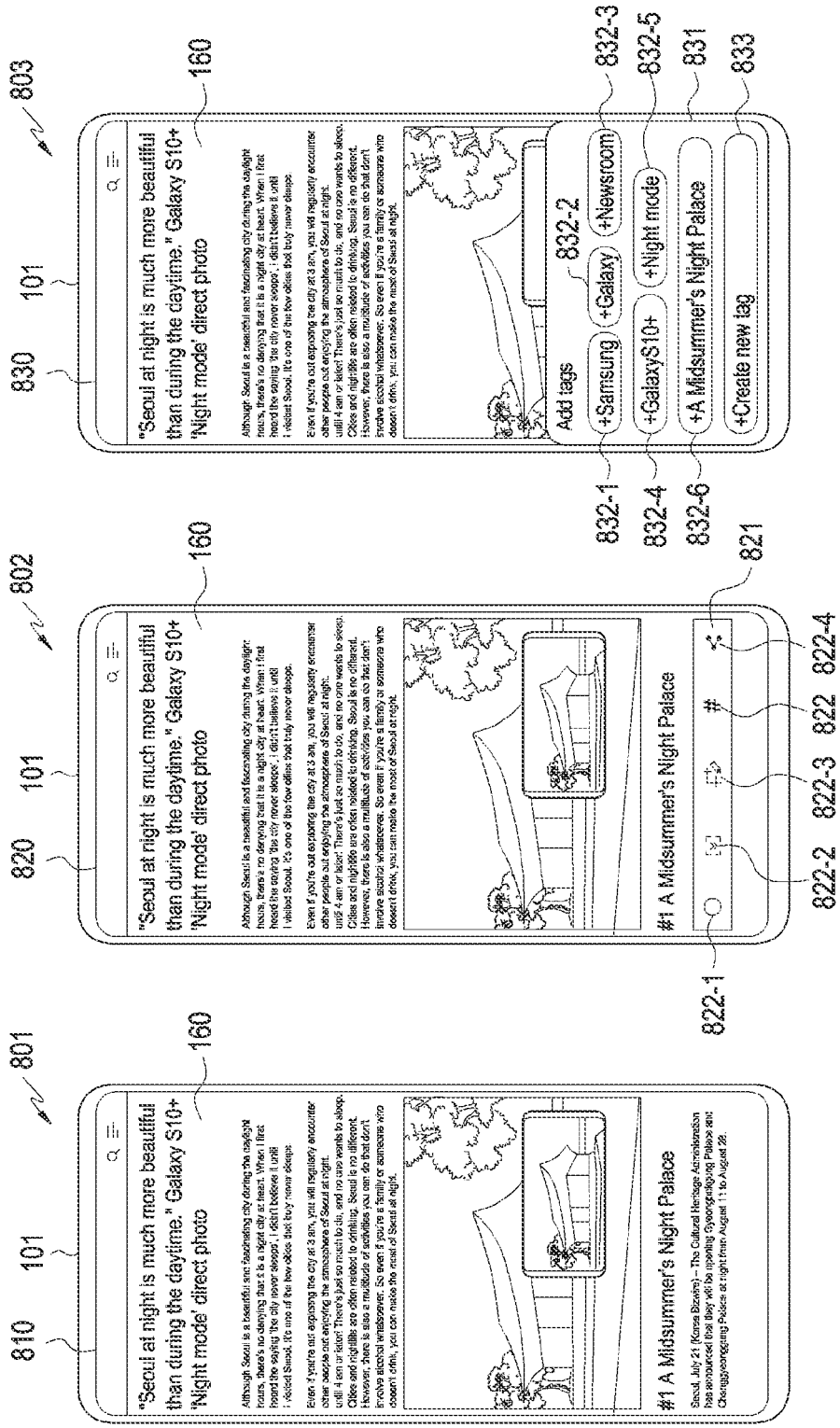
FIGS. 8A, 8B and 8C are diagrams illustrating example methods for providing a tag by an electronic device according to various embodiments.
Figure 8B:
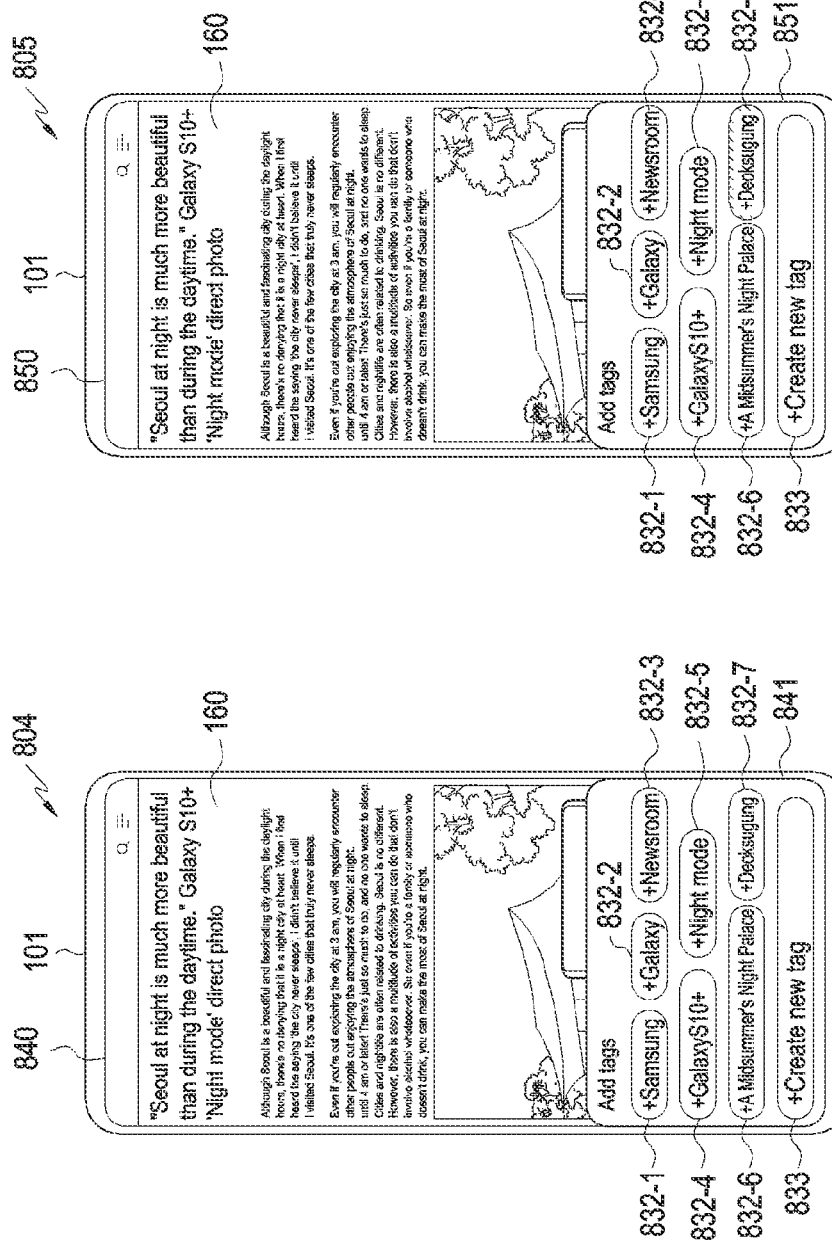
Figure 8C:
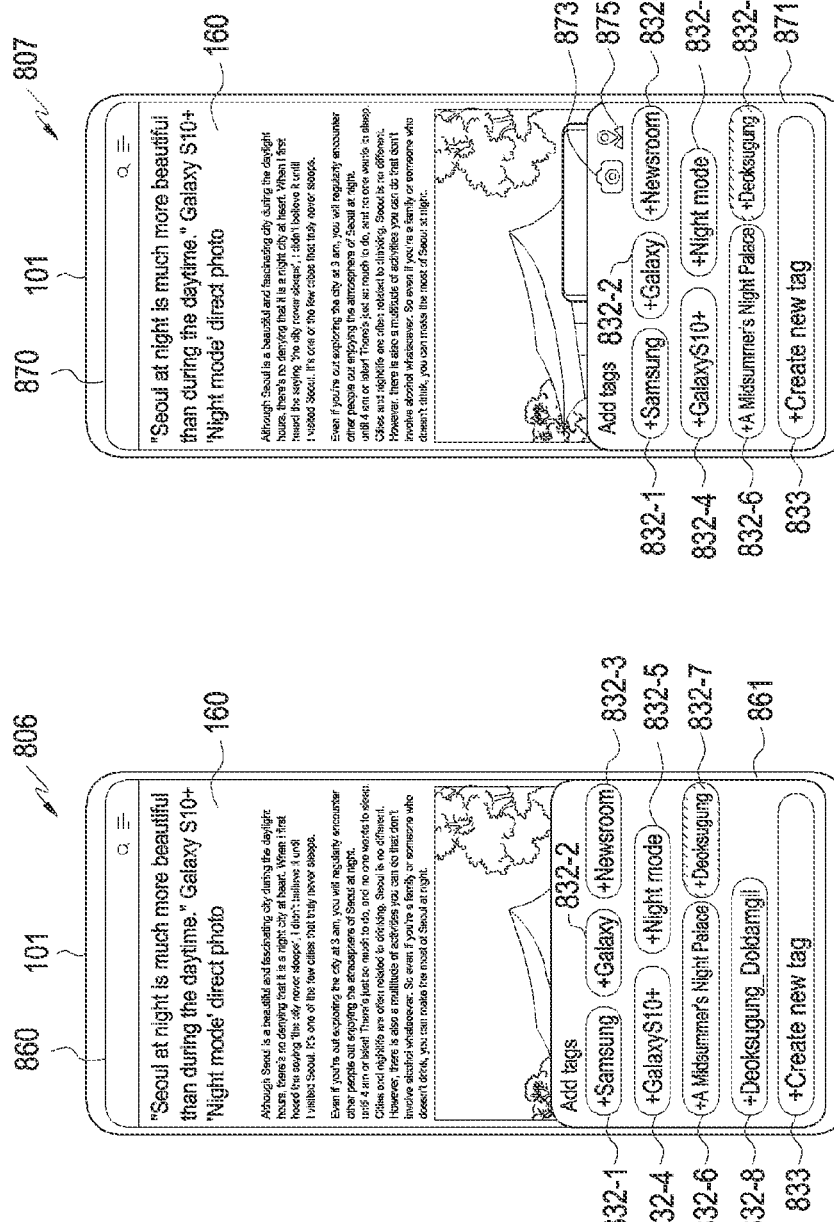

FIGS. 8A, 8B and 8C are diagrams illustrating example methods for providing a tag by an electronic device 101 according to various embodiments.

Referring to FIGS. 8A, 8B and 8C, in an embodiment, as shown in view 801, the processor 120 may display a screen 810 including text and an image through a display (e.g., the display device 160). In an embodiment, the screen 810 may be a screen displayed by executing a web application.

However, the screen to be captured or the screen to be subject to screen recognition (or screen capable of tag acquisition) is not limited to the execution screen of the web application, such as the screen 910. For example, the screen to be captured or the screen to be subject to screen recognition may include all screens that may be displayed through the display, such as a home screen or lock screen. Although the screen 810 is illustrated by way of non-limiting example as including text and an image both, the screen to be captured or the screen to be subject to screen recognition may include a screen including text alone or an image alone.

In an embodiment, the processor 120 may receive a user input for obtaining (or generating) an image (e.g., captured image) for the screen 810. In an embodiment, in response to receiving the user input, the processor 120 may display, through the display, a screen 820 including an interface 821 including objects representing a plurality of functions for performing the function related to the screen. For example, as shown in view 802, the processor 120 may display, through the display, an interface 821 including an object 822-2 representing a scroll capture function, an object 822-3 representing a function for editing the captured image, an object 822 representing a function for performing a recognition function on the screen, and an object 822-4 representing a function for sharing the captured image with other users, along with a shrunken image 822-1 of the screen 810.

In an embodiment, the processor 120 may perform a first recognition operation on the screen 810 in response to receiving a user input for selecting the object 822 representing the function for performing the recognition function on the screen 810. In an embodiment, as shown in view 803, the processor 120 may display, through the display, a screen 830 including a first interface 831 including 1-1th tags obtained through the first recognition operation. For example, the processor 120 may obtain the 1-1th tags by recognizing the text included in the screen 810 and display, through the display, the screen 830 including the 1-1th interface 831 including the objects 832-1 to 832-6 representing the obtained 1-1th tags. In an embodiment, the objects 832-1 to 832-6 representing the 1-1th tags may include '+' as an indicator indicating that the 1-1th tags are in the state of not being selected by the user. In an embodiment, the 1-1th interface may include the object 833 for generating a tag by receiving text from the user.

In an embodiment, the processor 120 may perform an operation related to a second recognition operation (e.g., recognition operation performed by an external electronic device (e.g., the server 108)) continuous from the first recognition operation on the screen 810. In an embodiment, the processor 120 may obtain at least one 1-2th tag by performing the operation related to the second recognition operation. For example, the processor 120 may recognize that the image included in the screens 810, 820, and 830 is 'Deoksugung' as an object (e.g., palace).

In an embodiment, the processor 120 may display a screen including a second user interface including the obtained at least one 1-1th tag, through the display. For example, as shown in view 804, the processor 120 may display, through the display, a screen 840 including a 1-2th user interface 841 including the object 832-7 representing at least one 1-2th tag.

In an embodiment, the processor 120 may receive a user input for selecting at least one tag among the tags included in the 1-2th user interface while displaying the 1-2th user interface. For example, the processor 120 may receive a user input for selecting the object 832-7 representing the tag among the tags included in the 1-2th user interface. In an embodiment, upon receiving a user input for selecting at least one tag among the tags included in the 1-2th user interface, the processor 120 may change the indicator of the object representing the selected tag to allow the object representing the selected tag to be distinguished from objects representing other non-selected tags. For example, as shown in view 805, when the object 832-7 is selected, the processor 120 may display a screen 805 in which the indicator of the object 832-7 changes from '+' to '#,' through the display.

In an embodiment, when at least one tag is selected from among the tags included in the 1-2th user interface, the processor 120 may obtain the second tag related to the selected at least one tag. For example, as shown in view 806, the processor 120 may obtain 'Deoksugung_Doldamgil' related to 'Deoksugung,' as the selected tag, as the second tag. The processor 120 may display, through the display, a screen 860 including a second user interface 861 including the object 832-7 representing the second tag. In an embodiment, although not shown in views 803, 804, and 805, the processor 120 may further display an object for performing (or starting) the operation of obtaining the second tag through the user interface (e.g., the 1-1th user interface or 1-2th user interface). The processor 120 may perform the operation of obtaining the second tag in response to a user input to the object for performing the operation of obtaining the second tag. However, without limited thereto, the processor 120 may perform the operation of obtaining the second tag related to the selected at least one tag, in response to (or immediately after) receiving the user input for selecting at least one tag among the tags included in the first user interface, without displaying the object for performing the operation of obtaining the second tag.

In an embodiment, the processor 120 may identify the function related to at least one tag among the tags obtained through recognition on the screen 810. The processor 120 may display, through the display, the user interface including the object representing the identified function. For example, as shown in view 807, the processor 120 may display, through the display, a screen 870 including a second user interface 871 including an object 873 for executing a night mode function related to the tag 'night mode' and an object 875 for executing the map application (or navigation application) related to the tag 'Deoksugung.'

In FIGS. 8A, 8B and 8C, the examples are described under the assumption that an image for the screen 810 (e.g., captured image) is generated, but are not limited thereto. For example, the processor 120 may perform a recognition operation on the screen displayed through the display, without generating an image for the screen. Further, the processor 120 may obtain a tag by generating an image for the screen 810 and then performing a recognition operation on the generated image, but is not limited thereto. For example, the processor 120 may perform a recognition operation on the screen 810 without generating an image for the screen 810.

Figure 9A:
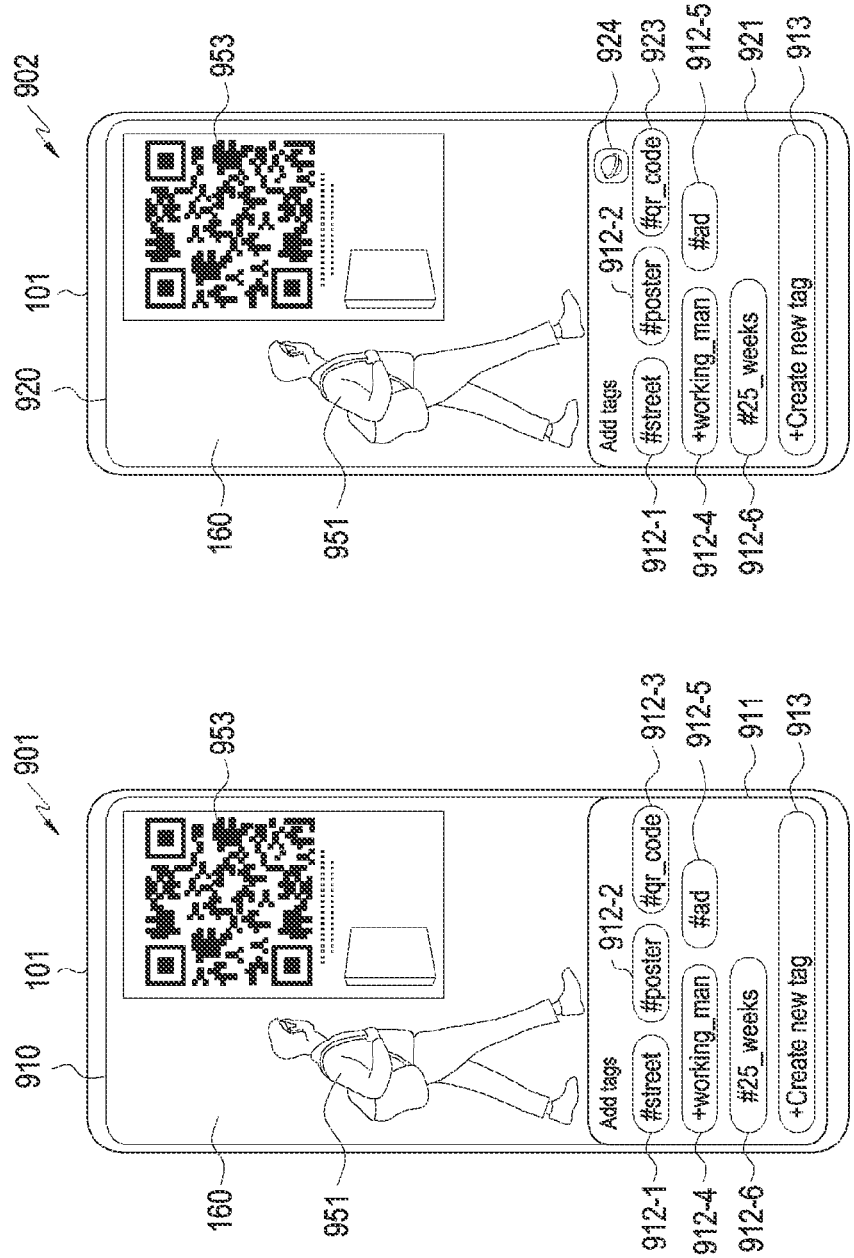
FIGS. 9A and 9B are diagrams illustrating an example method for providing a function related to a tag by an electronic device according to various embodiments.
Figure 9B:
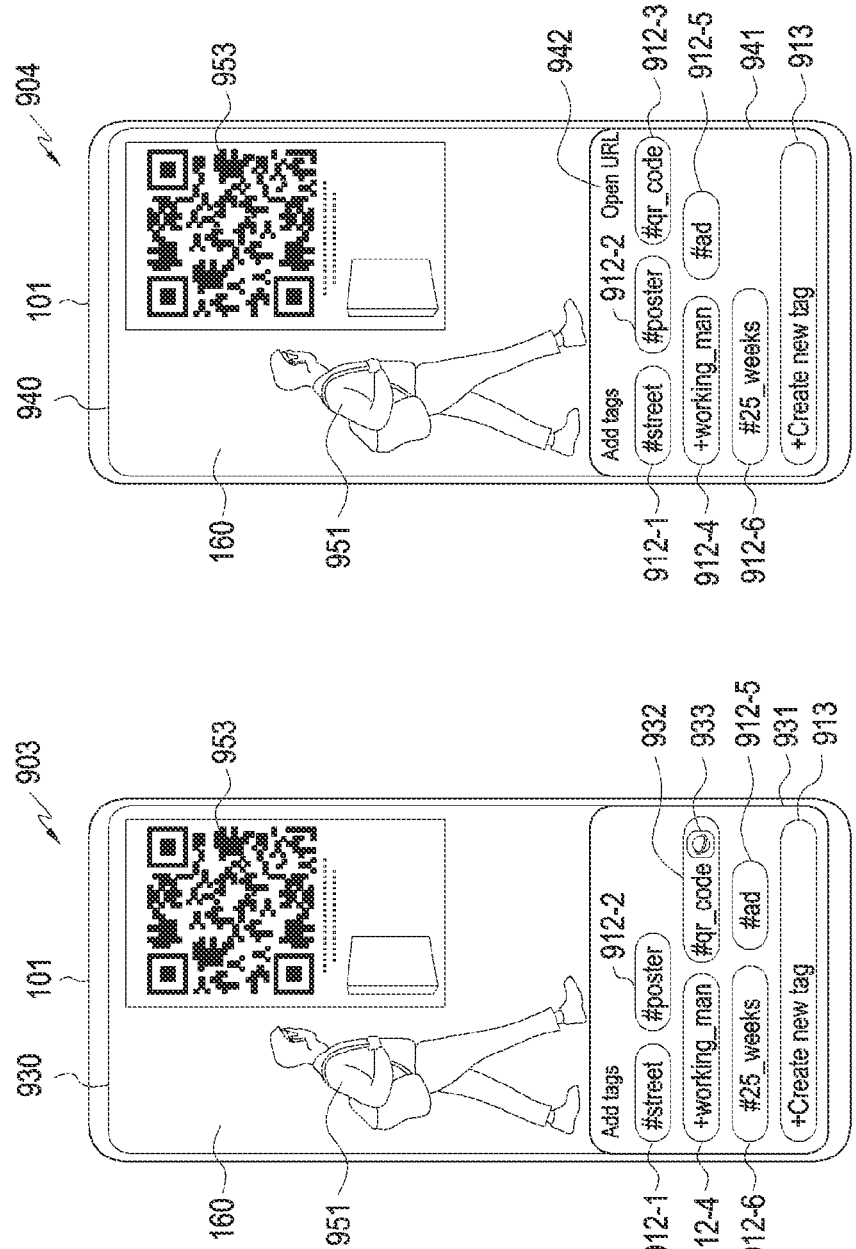

FIGS. 9A and 9B are diagrams illustrating an example method for providing a function related to a tag by an electronic device 101 according to various embodiments.

Referring to FIGS. 9A and 9B, in an embodiment, the processor 120 may display, through the display (e.g., the display device 160), a screen 910 including a 1-1th user interface 911 including objects 912-1 to 912-6 representing tags obtained through the first recognition operation, along with an image for a poster including a QR code 953 and a walking person 951 as shown in view 901. In an embodiment, in view 901, the objects 912-1, 912-2, 912-3, 912-5, and 912-6 may include an indicator (e.g., '#') indicating that they are selected by the user, and the object 912-4 may include an indicator (e.g., '+') indicating that it is not selected by the user. In an embodiment, the 1-1th user interface 911 may further include the object 913 for generating a tag by receiving text from the user.

In an embodiment, the processor 120 may display an object representing the function related to the tag obtained through the first recognition operation, through the display, in various manners, by performing the second recognition operation on the screen.

In an embodiment, the processor 120 may identify that the QR code 952 includes a specific uniform resource locator (URL) pattern by analyzing (or recognizing) the QR code 953 from the image. The processor 120 may identify that it is needed to execute the function of the web application to access a specific URL. The processor 120 may identify the function of the web application as a function related to the tag 'qr_code' of the QR code 953.

In an embodiment, as the screen 920 of view 902, the processor 120 may display, through the display, an object 924 representing the function related to the identified tag (or tag of the object 923), in the form of an image icon, in an area different from the area where the object 923 is displayed in the 1-2th user interface 921.

In an embodiment, as the screen 930 of view 903, the processor 120 may display, through the display, an object 933 representing the function related to the identified tag (or tag of the object 932 representing the tag), in the form of an image icon, along with the tag, in the object 932 included in the 1-2th user interface 931. In an embodiment, in response to receiving an input to the object 933 from the user, the processor 120 may execute the function corresponding to the object 933 (e.g., function of the web application, a function of displaying information by accessing the specific URL of the QR code 953 through the web application).

In an embodiment, as the screen 940 of view 904, the processor 120 may display, through the display, an object 942 representing the function related to the identified tag (or tag of the object 912-3), in the form of a text icon, in an area different from the area where the object 912-3 is displayed in the 1-2th user interface 941.

Figure 10A:
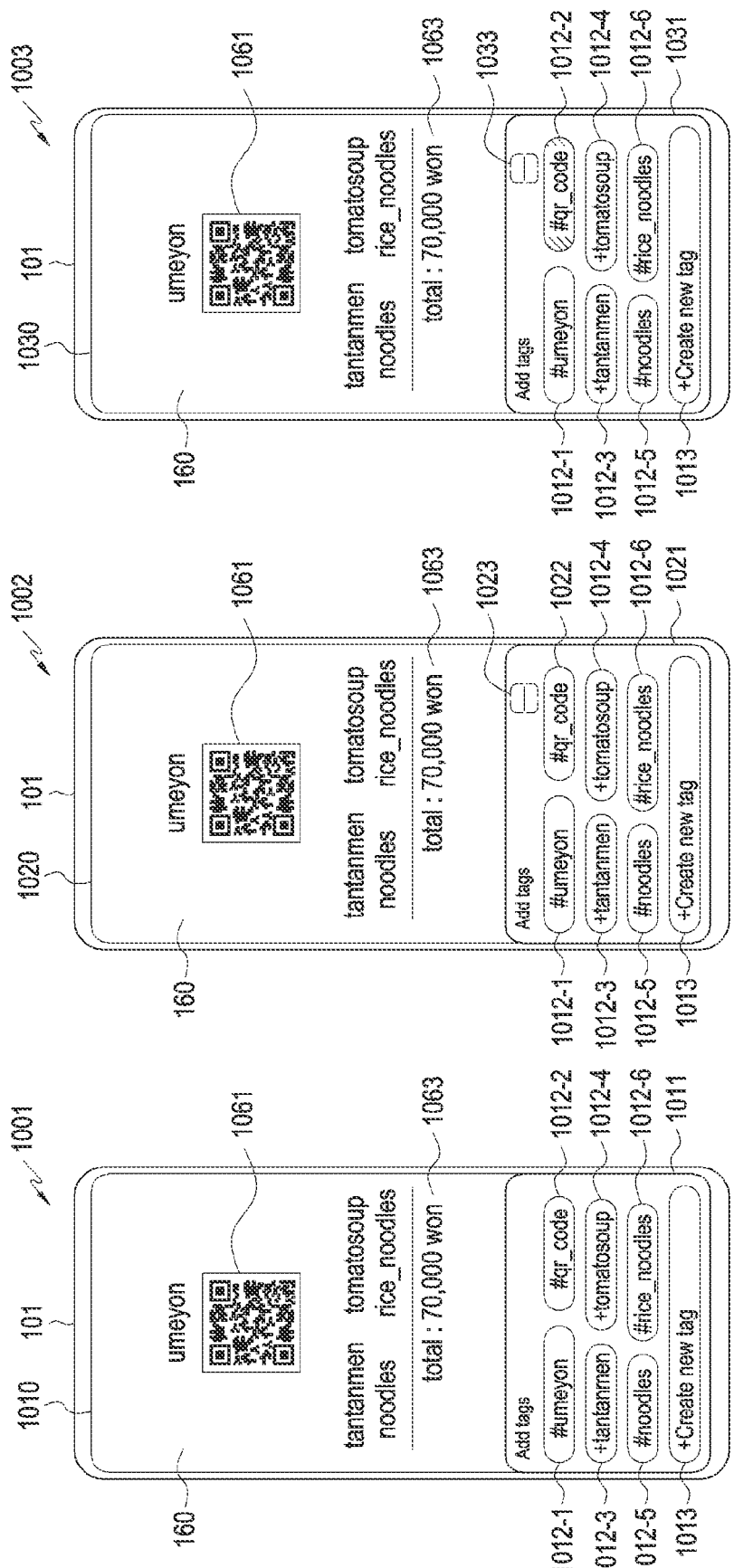
FIGS. 10A and 10B are diagrams illustrating an example method for providing a function related to a tag by an electronic device according to various embodiments.
Figure 10B:
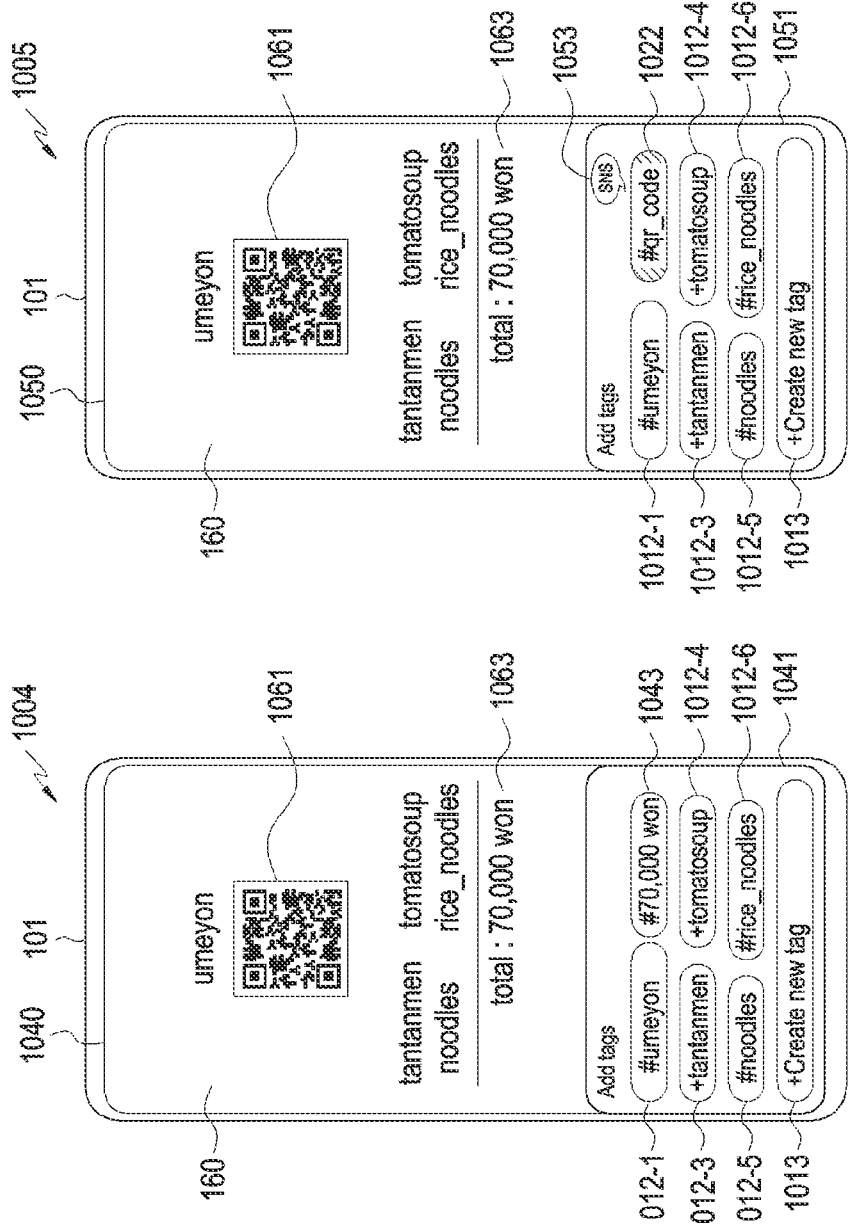

FIGS. 10A and 10B are diagrams illustrating an example method for providing a function related to a tag by an electronic device 101 according to various embodiments.

Referring to FIGS. 10A and 10B, in an embodiment, the processor 120 may display, through the display (e.g., the display device 160), a screen 1010 including a 1-1th user interface 1011 including objects 1012-1 to 1012-6 representing tags obtained through the first recognition operation, along with an image including a QR code 1061, foods ordered by the user and a cost 1063 for the foods ordered by the user as shown in view 1001. In an embodiment, in view 1001, the objects 1012-1, 1012-2, 1012-5, and 1012-6 may include an indicator (e.g., '#') indicating that they are selected by the user, and the objects 1012-3 and 1012-4 may include an indicator (e.g., '+') indicating that it is not selected by the user. In an embodiment, the 1-1th user interface 1011 may further include the object 1013 for generating a tag by receiving text from the user.

In an embodiment, the processor 120 may display an object representing the function related to the tag obtained through the first recognition operation, through the display, in various manners, by performing the second recognition operation on the screen.

In an embodiment, the processor 120 may identify that the QR code 1061 includes information about the payment for the cost 1063 of the foods ordered by the user by analyzing (or recognizing) the QR code 1061 from the image. The processor 120 may identify that it is needed to execute the function of the payment application to pay for the cost of the foods ordered by the user. The processor 120 may identify the function of the payment application as a function related to the tag 'qr_code' of the QR code 1061.

In an embodiment, as the screen 1020 of view 1002, the processor 120 may display, through the display, an object 1023 representing the function related to the identified tag (or tag of the object 1022), in the form of an image icon, in an area different from the area where the object 1023 is displayed in the 1-2th user interface 1021.

In an embodiment, as the screen 1030 of view 1003, the processor 120 may display the object 1033 representing the function related to the identified tag (or tag of the object 1032) in the form of an image icon in an area different from the area where the object 1032 is displayed in the 1-2th user interface 1031 through the display and, to indicate that the tag of the object 1032 is related to the function of the object 1033, change the form of the object 1032 (e.g., change at least one of the color, brightness, or saturation of the object 1032) and display it.

In an embodiment, the processor 120 may change the 1-1th tag into the 1-2th tag. For example, referring to comparison between the 1-1th user interface 1011 of the screen 1010 of view 1001 and a 1-2th user interface 1041 of the screen 1040 of view 1004, the processor 120 may change the object 1012-2 representing the tag 'qr_code' into the object 1043 representing the tag '70,000 won.' The processor 120 may identify the cost (e.g., 70,000 won) for the foods ordered by the user, as information indicated by a specific pattern, by analyzing the specific pattern of the QR code 1061 included in the image. The processor 120 may obtain the identified cost as a tag and change the tag 'qr_code' obtained through the first recognition operation into the tag '70,000 won' obtained through the second recognition operation.

In an embodiment, as shown in the screen 1050 of view 1005, the processor 120 may display, through the display, a 1-2th user interface 1051 including an object 1053 to store tags (e.g., tags represented by the objects 1012-1, 1022, 1012-5, and 1012-6) selected by the user to correspond to the SNS application account of the user of the electronic device 101.

Figure 11:
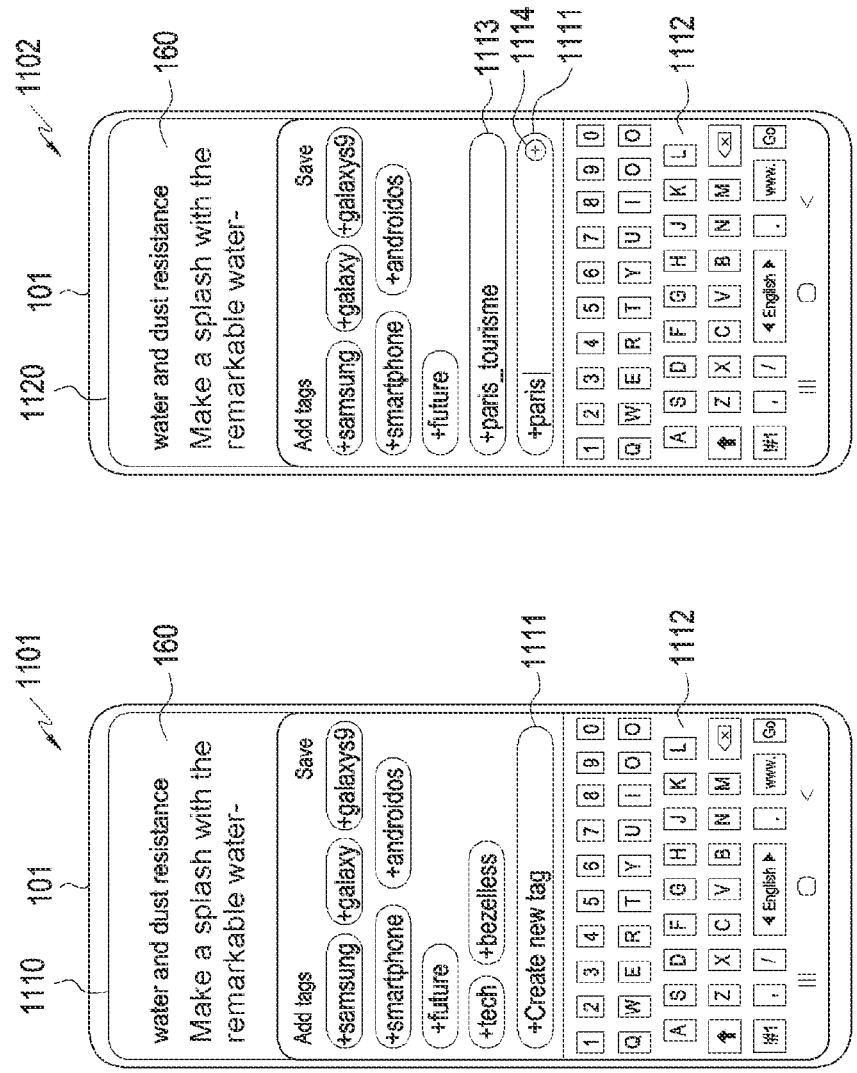
FIG. 11 is a diagram illustrating an example method for providing a tag by a user inputting text according to various embodiments.

FIG. 11 is a diagram illustrating an example method for providing a tag by a user inputting text according to various embodiments.

Referring to FIG. 11, in an embodiment, the processor 120 may display, through the display, a user interface including an object (e.g., the object 1111) capable of generating a tag by a user input (or manually) along with at least one tag. In an embodiment, upon receiving a user input to the displayed object while displaying the object capable of generating a tag by a user input, along with at least one tag, the processor 120 may display, through the display (e.g., the display device 160), a keyboard 1112 along with the object capable of generating a tag by a user input, as the screen 1110 of view 1101.

In an embodiment, upon receiving a user input for inputting text through the keyboard 1112, the processor 120 may display the input text through the object 1111 as the screen 1120 of view 1102. In an embodiment, if one or more characters are input from the user, the processor 120 may display, through the object 1113, the text provided by an auto-complete function for the characters input through the object 1111. In an embodiment, upon receiving an input to the object 1114 from the user after the text is input, the processor 120 may obtain the input text as a tag and display the obtained tag through the display.

Figure 12:
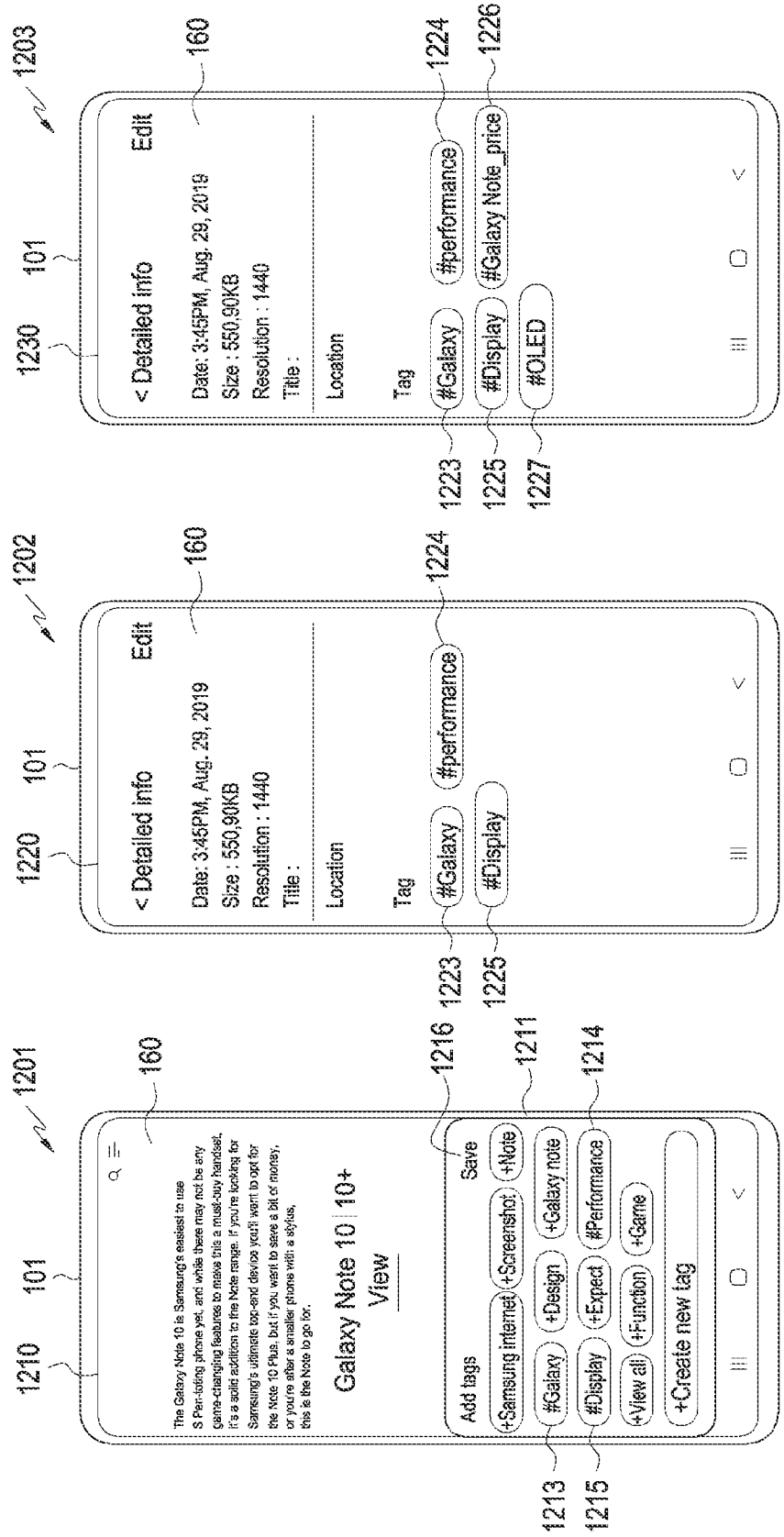
FIG. 12 is a diagram illustrating an example method for storing a tag according to various embodiments.

FIG. 12 is a diagram illustrating an example method for storing a tag according to various embodiments.

Referring to FIG. 12, in an embodiment, the processor 120 may obtain one or more tags and then display, through the display (e.g., the display device 160), a user interface 1211 including the obtained one or more tags. The processor 120 may receive a user input for selecting at least one tag among the one or more tags included in the user interface 1211. In an embodiment, as the screen 1210 of view 1201, the processor 120 may indicate that objects 1213, 1214, and 1215 representing tags among the objects representing one or more tags included in the user interface 1211 are selected by the user.

In an embodiment, upon receiving a user input to the object 1216 for storing the selected tag, the processor 120 may store the selected tag in the memory 130.

In an embodiment, view 1202 may show a screen 1220 showing detailed information about the image captured and then stored for the screen. In an embodiment, as shown in the screen 1220, the processor 120 may store, in the memory 130, tags (e.g., the tags 1223, 1224, and 1225) selected in association with the image captured for the screen.

In an embodiment, upon receiving a user input for storing the selected tag in a state in which the second recognition operation continuous from the first recognition operation on the screen is not completed, the processor 120 may store the selected tag in the memory 130 and continuously perform the incomplete second recognition operation. Upon additionally (or newly) obtaining a tag by continuously performing the incomplete second recognition operation, the processor 120 may store the additionally obtained tag along with the selected tag previously stored in the memory 130. For example, as shown in the screen 1230 of view 1203, upon additionally (or newly) obtaining a tag by continuously performing the incomplete second recognition operation when storing the tags 1223, 1224, and 1225, the processor 120 may further store, in the memory 130, the additionally obtained at least one tag 1226 and 1227, along with the tags 1223, 1224, and 1225 previously stored in the memory 130.

Figure 13:
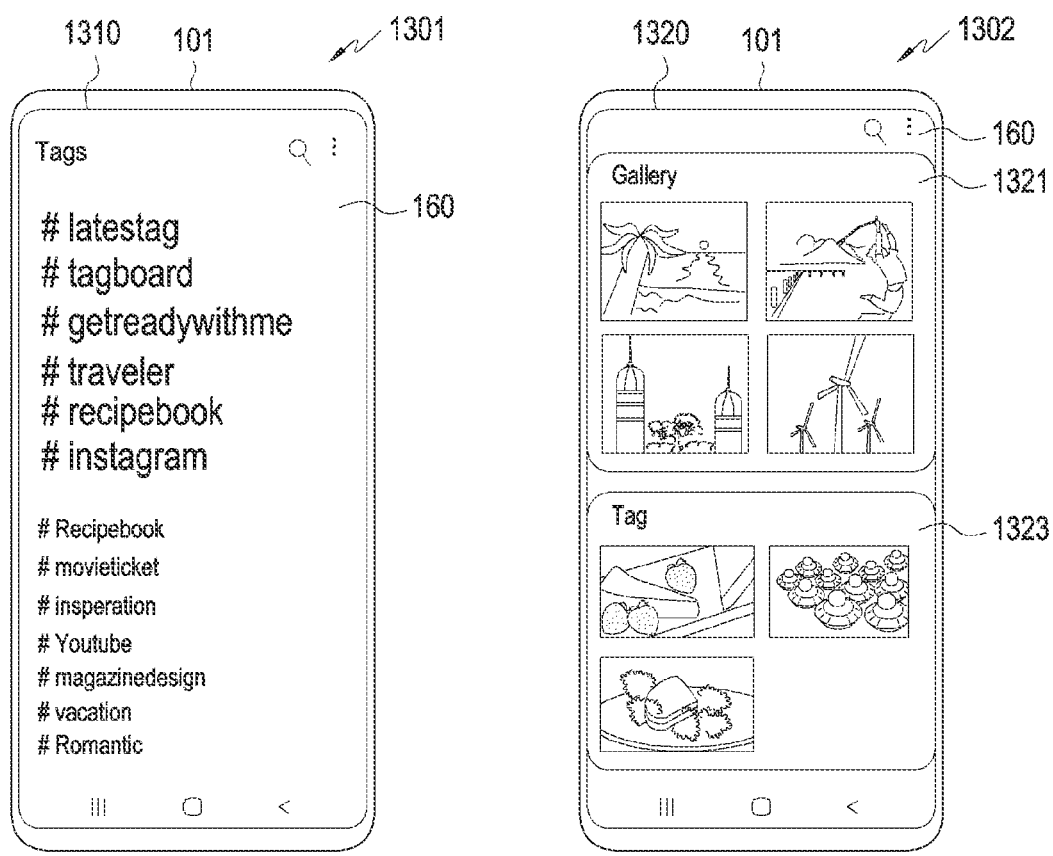
FIG. 13 is a diagram illustrating an example method for displaying a stored tag according to various embodiments.

FIG. 13 are diagrams 1301 and 1302 illustrating an example method for displaying a stored tag according to various embodiments.

Referring to FIG. 13, in an embodiment, upon storing obtained at least one tags, the processor 120 may display, through the display (e.g., the display device 160), a screen 1310 including a list of the stored tags.

In an embodiment, in response to executing an application (e.g., Tags application) for managing the stored tags, the processor 120 may display, through the display, the screen 1310 including the list of the stored tags.

In an embodiment, the processor 120 may display the stored tags through a gallery application managing images. For example, as shown in the screen 1320 of view 1302, when the gallery application is executed, the processor 120 may display content stored in relation to the gallery application through an area 1321 and display, through an area 1323, the tags stored in association with the content stored in relation to the gallery application.

However, the method for displaying a screen including a list of stored tags is not limited to the above-described examples.

According to various example embodiments of the disclosure, a method for providing a tag by an electronic device may comprise: receiving a first input while displaying a screen through a display of the electronic device, obtaining one or more first tags related to the screen by performing an operation related to a recognition operation on the screen based on the first input, displaying a first user interface including the one or more first tags through the display, selecting at least one first tag from among the one or more first tags based on a second input while displaying the first user interface, obtaining at least one second tag related to the at least one first tag, and displaying a second user interface including the at least one second tag through the display.

In various example embodiments, the recognition operation on the screen may include a plurality of recognition operations including a first recognition operation and a second recognition operation performed continuously from the first recognition operation. The first recognition operation may be performed by the electronic device, and the second recognition operation may be performed by an external electronic device (e.g., the server 108) connected with the electronic device.

In various example embodiments, obtaining the one or more first tags may include obtaining at least one first first tag through the first recognition operation and obtaining at least one second first tag through the second recognition operation. Displaying the first user interface may include displaying the first user interface including the obtained at least one first first tag through the display and displaying the first user interface including the first first tag and the at least one second first tag obtained by performing the second recognition operation while displaying the first user interface, through the display.

In various example embodiments, the method may further comprise storing at least one tag among the one or more first tags. Obtaining the one or more first tags, displaying the first user interface, and storing the at least one tag may include obtaining at least one first first tag through the first recognition operation, displaying the first user interface including the obtained at least one first first tag through the display, storing the at least one first first tag in a memory in response to an input received while the second recognition operation is performed, obtaining at least one second first tag as the second recognition operation is completed after the at least one first first tag is stored, and storing, in the memory, the obtained at least one second first tag along with the at least one first first tag.

In various example embodiments, obtaining the at least one second tag may include: obtaining the at least one second tag related to the at least one first tag, through the electronic device or an external electronic device (e.g., the server 108) connected with the electronic device.

In various example embodiments, obtaining the at least one second tag may include: identifying content stored in a memory of the electronic device in association with the at least one first tag and obtaining at least one of at least one tag stored in association with the content or information related to the content, as the at least one second tag.

In various example embodiments, obtaining the at least one second tag may include: identifying content stored in association with the at least one first tag in the electronic device providing a web service subscribed to using an account of a user of the electronic device and obtaining, as the at least one second tag, at least one of at least one tag stored in association with the content or information related to the content.

In various example embodiments, the method may further comprise: identifying a function related to at least one tag of the second tag or the one or more first tags and displaying, through the display, the first user interface or the second user interface including an object representing the identified function.

Further, the structure of the data used in various example embodiments of the disclosure may be recorded in a non-transitory computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a display;
   a processor operatively connected with the display; and
   a memory operatively connected with the processor, wherein the memory stores instructions that, when executed, cause the electronic device to:
   receive a first input while displaying a screen through the display,
   obtain one or more first tags related to the screen by performing an operation related to a recognition operation on the screen based on the first input,
   display a first user interface including the one or more first tags through the display,
   select at least one first tag from among the one or more first tags based on a second input received while displaying the first user interface,
   obtaining at least one second tag related to the at least one first tag, and
   display a second user interface including the at least one second tag through the display,
   wherein the instructions that, when executed, cause the electronic device to:
   identify content stored in the memory in association with the at least one first tag, and
   obtain at least one of at least one tag stored in association with the content or information related to the content, as the at least one second tag.

2. The electronic device of claim 1, wherein the recognition operation on the screen includes a plurality of recognition operations including a first recognition operation and a second recognition operation performed continuously from the first recognition operation, and
   wherein the first recognition operation is performed by the electronic device, and the second recognition operation is performed by an external electronic device connected with the electronic device.

3. The electronic device of claim 2, wherein the instructions that, when executed, cause the electronic device to:
   obtain at least one first first tag through the first recognition operation,
   obtain at least one second first tag through the second recognition operation,
   display the first user interface including the obtained at least one first first tag through the display, and display the first user interface including the first first tag and the at least one second first tag obtained by performing the second recognition operation while displaying the first user interface, through the display.

4. The electronic device of claim 2, wherein the instructions that, when executed, cause the electronic device to:
obtain at least one first first tag through the first recognition operation,
display the first user interface including the obtained at least one first first tag through the display,
store the at least one first first tag in the memory in response to an input received while the second recognition operation is performed,
obtain at least one second first tag as the second recognition operation is completed after the at least one first first tag is stored, and
store, in the memory, the obtained at least one second first tag along with the at least one first first tag.

5. The electronic device of claim 1, wherein the instructions that, when executed, cause the electronic device to obtain the at least one second tag related to the at least one first tag, through the electronic device or an external electronic device connected with the electronic device.

6. The electronic device of claim 5, wherein the instructions that, when executed, further cause the electronic device to:
identify content stored in association with the at least one first tag in the electronic device providing a web service subscribed to using an account of a user of the electronic device, and
obtain, as the at least one second tag, at least one of at least one tag stored in association with the content or information related to the content.

7. The electronic device of claim 1, wherein the instructions that, when executed, cause the electronic device to display, through the display, the second user interface including the one or more first tags and the at least one second tag.

8. The electronic device of claim 1, wherein the instructions that, when executed, cause the electronic device to:
identify a function related to at least one tag of the at least one second tag or the one or more first tags, and
display, through the display, the first user interface or the second user interface including an object representing the identified function.

9. An electronic device comprising:
a display;
a processor operatively connected with the display; and
a memory operatively connected with the processor, wherein the memory stores instructions that, when executed, cause the electronic device to:
receive an input while displaying a screen through the display,
obtain at least one first tag related to the screen by performing a first recognition operation on the screen based on the input,
display a first user interface including the at least one first tag through the display,
obtain at least one second tag through a second recognition operation on the screen performed by an external electronic device connected with the electronic device and continuous from the first recognition operation while the first user interface is displayed, and
display a second user interface including the obtained at least one second tag through the display,
wherein the instructions that, when executed, further cause the electronic device to:
identify a function related to at least one of the at least one second tag or the at least one first tag, and
display the first user interface or the second user interface including an object indicating the identified function through the display.

10. The electronic device of claim 9, wherein the instructions that, when executed, further cause the electronic device to:
store the at least one first tag in the memory in response to an input received while the second recognition operation is performed,
obtain at least one second tag as the second recognition operation is completed after the at least one first tag is stored, and
store, in the memory, the obtained at least one second tag along with the at least one first tag.

11. A method for providing a tag by an electronic device, the method comprising:
receiving a first input while displaying a screen through a display of the electronic device;
obtaining one or more first tags related to the screen by performing an operation related to a recognition operation on the screen based on the first input;
displaying a first interface including the one or more first tags through the display;
selecting at least one first tag from among the one or more first tags based on a second input received while displaying the first user interface;
obtaining at least one second tag related to the at least one first tag; and
displaying a second user interface including the at least one second tag through the display,
wherein obtaining the at least one second tag comprises:
identifying content stored in a memory of the electronic device in association with the at least one first tag; and
obtaining at least one of at least one tag stored in association with the content or information related to the content, as the at least one second tag.

12. The method of claim 11, wherein the recognition operation on the screen includes a plurality of recognition operations including a first recognition operation and a second recognition operation performed continuously from the first recognition operation, and
wherein the first recognition operation is performed by the electronic device, and the second recognition operation is performed by an external electronic device connected with the electronic device.

13. The method of claim 12, wherein obtaining the one or more first tags comprises:
obtaining at least one first first tag through the first recognition operation; and
obtaining at least one second first tag through the second recognition operation, wherein
displaying the first user interface includes,
displaying the first user interface including the obtained at least one first first tag through the display; and
displaying the first user interface including the first first tag and the at least one second first tag obtained by performing the second recognition operation while displaying the first user interface, through the display.

14. The method of claim 12, further comprising storing at least one tag among the one or more first tags,
wherein obtaining the one or more first tags, displaying the first user interface, and storing the at least one tag comprises:
obtaining at least one first first tag through the first recognition operation;

displaying the first user interface including the obtained at least one first first tag through the display;

storing the at least one first first tag in a memory of the electronic device in response to an input received while the second recognition operation is performed;

obtaining at least one second first tag as the second recognition operation is completed after the at least one first first tag is stored; and storing, in the memory, the obtained at least one second first tag along with the at least one first first tag.

15. The method of claim 11, wherein obtaining the at least one second tag comprises obtaining the at least one second tag related to the at least one first tag, through the electronic device or an external electronic device connected with the electronic device.

16. The method of claim 15, wherein obtaining the at least one second tag further comprises:

identifying content stored in association with the at least one first tag in the electronic device providing a web service subscribed to using an account of a user of the electronic device; and obtaining, as the at least one second tag, at least one of at least one tag stored in association with the content or information related to the content.

17. The method of claim 11, further comprising:

identifying a function related to at least one tag of the at least one second tag or the one or more first tags; and displaying, through the display, the first user interface or the second user interface including an object representing the identified function.

\* \* \* \* \*